United States Patent [19]

Tsujii et al.

[11] Patent Number: 5,189,618
[45] Date of Patent: Feb. 23, 1993

[54] AUTOMOTIVE CRUISE CONTROL SYSTEM FOR CONTROLLING VEHICLE TO RUN AT CONSTANT SPEED

[75] Inventors: Masao Tsujii, Nagoya; Hitoshi Takeuchi, Kariya; Kyoji Oda, Gamagori; Masahiro Ohba, Okazaki; Yutaka Ninoyu, Oobu; Tsutomu Natsume, Nagoya, all of Japan

[73] Assignee: Nippondenso Co., Ltd., Kariya, Japan

[21] Appl. No.: 908,879

[22] Filed: Jul. 7, 1992

Related U.S. Application Data

[63] Continuation of Ser. No. 545,195, Jun. 28, 1990, abandoned.

[30] Foreign Application Priority Data

Jun. 28, 1989 [JP] Japan .................. 1-166245

[51] Int. Cl.⁵ ............... B60K 31/04; B60K 31/00
[52] U.S. Cl. ................... 364/426.04; 364/150; 180/179; 180/170; 123/351; 123/361
[58] Field of Search ............... 364/426.01, 424.01, 364/150, 151; 180/170, 179; 123/351, 361

[56] References Cited

U.S. PATENT DOCUMENTS

| | | | |
|---|---|---|---|
| 4,679,136 | 7/1987 | Shigemasa | 364/150 |
| 4,771,389 | 9/1988 | Takahashi et al. | 364/553 |
| 4,771,848 | 9/1988 | Namba et al. | 364/42.04 |
| 4,774,651 | 9/1988 | El-Ibiary et al. | 364/553 |
| 4,829,438 | 5/1989 | Etoh | 364/426.04 |
| 4,840,245 | 1/1989 | Kamei et al. | 364/431.05 |
| 4,870,583 | 9/1989 | Takahashi et al. | 364/426.04 |
| 4,908,764 | 3/1990 | Etoh | 364/426.04 |
| 4,911,259 | 3/1990 | Dogahara et al. | 364/426.04 |

FOREIGN PATENT DOCUMENTS

| | | |
|---|---|---|
| 334415 | 6/1985 | Fed. Rep. of Germany ............ 364/426.04 |
| 61-191435 | 8/1986 | Japan . |
| 62-85733 | 4/1987 | Japan . |
| 62-241737 | 10/1987 | Japan . |
| 63-64833 | 3/1988 | Japan . |
| 1-9036 | 1/1989 | Japan . |
| 1-44230 | 3/1989 | Japan . |

*Primary Examiner*—Vincent W. Trans
*Attorney, Agent, or Firm*—Cushman, Darby & Cushman

[57] ABSTRACT

An automotive cruise control system equipped with an actuator to regulate the state of an automobile in accordance with a control signal indicative of an actuator control amount so that the vehicle maintains a target speed, the actuator control amount being determined on the basis of the speed of the vehicle and the operation state of the actuator. The automotive cruise control system is arranged so as to divide the vehicle into first and second systems: the first system on-line-identifies a model corresponding to the state of the vehicle; the second system on-line-identifies a model corresponding to the actuator used in the vehicle. The actuator control amount is calculated on the basis of the first and second system models to produce the actuator control signal in correspondence with these models. By identifying two models, the time lag normally associated with this type of automotive cruise control system is reduced because this arrangement allows simplifying the identification of the model relating to the vehicle concurrently with realizing accurate control of the vehicle.

13 Claims, 17 Drawing Sheets

AUTOMOTIVE CRUISE CONTROL SYSTEM FOR CONTROLLING VEHICLE TO RUN AT CONSTANT SPEED

This is a continuation of application Ser. No. 07/545,195, filed on Jun. 28, 1990, now abandoned.

BACKGROUND OF THE INVENTION

The present invention relates generally to a control system for controlling an actuator which regulates the state of a controlled apparatus so that the controlled apparatus assumes a desirable condition.

As one example of such control systems is known an automotive cruise control system for use in motor vehicles which is for the purposes of improving the response and following performance of the constant-speed control executed when the motor vehicle runs at a constant speed. As disclosed in the Japanese Patent Provisional Publication No. 62-85733, 62-241737 or 63-64833, the automotive cruise control system is arranged such that a state observer and an optimal feedback gain are respectively determined on the basis of a model predetermined through a system identification so that a state control amount is attained by the state observer in accordance with a control input amount (for example, throttle valve drive current) and a control output amount (for example, actual vehicle speed) so as to control the vehicle speed in accordance with a control input amount determined on the basis of the optimal feedback gain and the state control amount.

There is a problem which arises with this type of control system, however, in that the identification for determination of the model relating to the controlled system is required to be made in advance in designing stages and, because the models are different from each other between different types of motor vehicles, the system identification is required to be made for each of the different types of motor vehicles to result in being greatly troublesome. In addition, problems can be encountered in terms of difficulty of sufficiently suppressing affections from the characteristic variation of the controlled system so as to lead to inaccuracy of the model due to the controlled system characteristic variation. Further, although in an auto pilot control system for use in ships the model identification is made by means of an one-line operation so as to perform the above-mentioned control and a high-order system identification is required in order to realize high-accurate control, the on-line high-order model identification takes a relatively long time and is hence difficult to be employed for a controlled system in motor vehicles (for example) in which the control period is relatively short.

SUMMARY OF THE INVENTION

It is therefore an object of the present invention to provide a control system which is capable of performing accurate control and further which can be employed for a controlled system whose control period is short.

With this and other features which will become apparent as the description proceeds, included in an automatic cruise control system according to the present invention which is equipped with actuator means to regulate the speed of a vehicle is actuator control signal outputting means which determines an actuator control amount on the basis of the current speed of the vehicle detected and the operation state of the actuator means so as to output to the actuator means a control signal in accordance with the determined actuator control amount so that the vehicle maintains a target speed. The actuator control signal outputting means includes first identification means for on-line-identifying a model corresponding to a first system of the vehicle whose characteristic variation is greater, second identification means for on-line-identifying a model corresponding to a second system of the vehicle, whose characteristic variation is smaller, at a different timing from the model identification of the first identification means, and actuator control amount calculating means for calculating the actuator control amount on the basis of the identified first and second models.

That is, in this invention, the vehicle is divided into first and second systems: one being subjected to a greater characteristic variation and the other being subjected to a smaller characteristic variation, and the first identification means on-line-identifies a model corresponding to the first system, preferably, at a predetermined time interval and the second identification means on-line-identifies a model corresponding to the second system. The actuator control amount calculating means determines an actuator control amount on the basis of the first and second system models to output an actuator control signal corresponding thereto. Further, also included in the automotive cruise control system are first setting means which on-line-sets a control parameter with the transfer function obtained on the basis of the first system model being regarded as a true value of the first system and second setting means which on-line-sets a control parameter with the transfer function obtained on the basis of the second system model being regarded as a true value of the second system and further actuator control amount determining means which determines the actuator control amount on the basis of the set control parameters.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
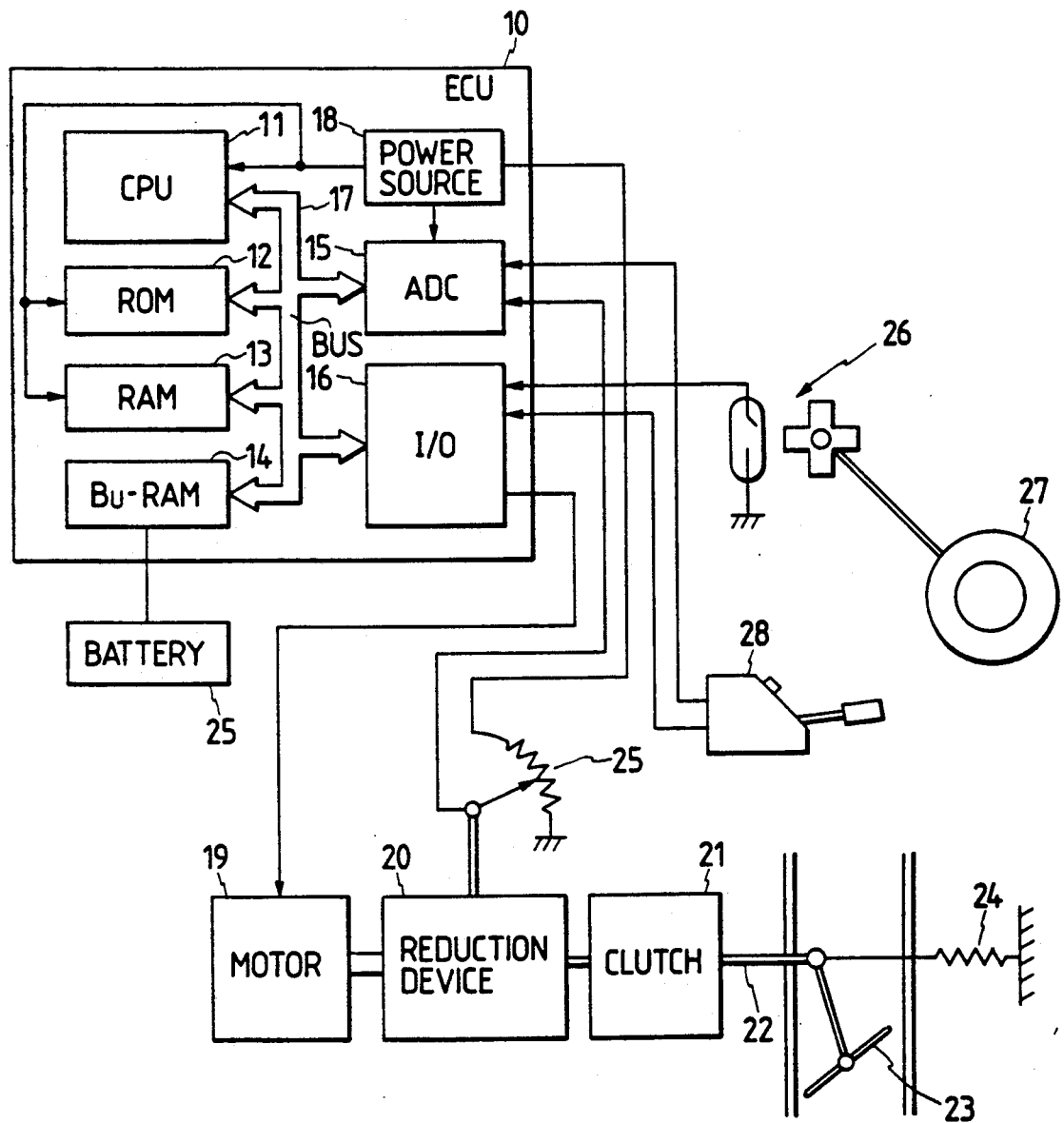
FIG. 1 is an illustration of an arrangement of an automotive cruise control system according to an embodiment of the present invention which is incorporated into a motor vehicle.

Referring now to FIG. 1, there is schematically illustrated an automotive cruise control system according to an embodiment of the present invention which is incorporated into a motor vehicle. In FIG. 1, illustrated at numeral 10 is an electronic control unit (ECU) comprising a well known a microcomputer, for example, which is equipped with a central processing unit (CPU) 11, a read-only memory (ROM) 12, a random access memory (RAM) 13 and a back-up random access memory (Bu-RAM) 14. The CPU 11, ROM 12 and RAM 13 are respectively powered with a constant voltage from a power source 18, while the Bu-RAM 14 is coupled to another power source (battery) 25 so as to be powered with a constant voltage to maintain its stored contents irrespective of turning-off of an ignition switch of the motor vehicle. Also included in the ECU 10 are an analog-to-digital converter (ADC) 15 for converting input analog signals from external devices into digital signals suitable for processing in the CPU 11 and an input and output port (I/0) 16 for receiving signals from external devices and supplying signals from the CPU 11 to external devices. Signals to and from the CPU 11 are carried along a common bus 17 to which are coupled the aforementioned associated units.

Illustrated at numeral 23 is a throttle valve which acts as an actuator for regulating an intake amount into an engine (not shown) of the motor vehicle during the constant-speed travelling control execution. The throttle valve 23 is arranged to be driven by means of a motor 19 through a reduction device 20, a clutch 21, a link mechanism 22 and a return spring 24. The motor 19 is driven in accordance with a control signal U from the ECU 10 so as to perform the opening and closing operation of the throttle valve 23 through the clutch 21 and link mechanism 22 after the rotational speed of the motor 19 is reduced by means of the reduction device 20 to increase its torque. The return spring 24 always applies a biasing force to the link mechanism 22 whereby the throttle valve 23 takes the fully closed position in response to the disconnecting operation of the clutch 21.

Figure 2:
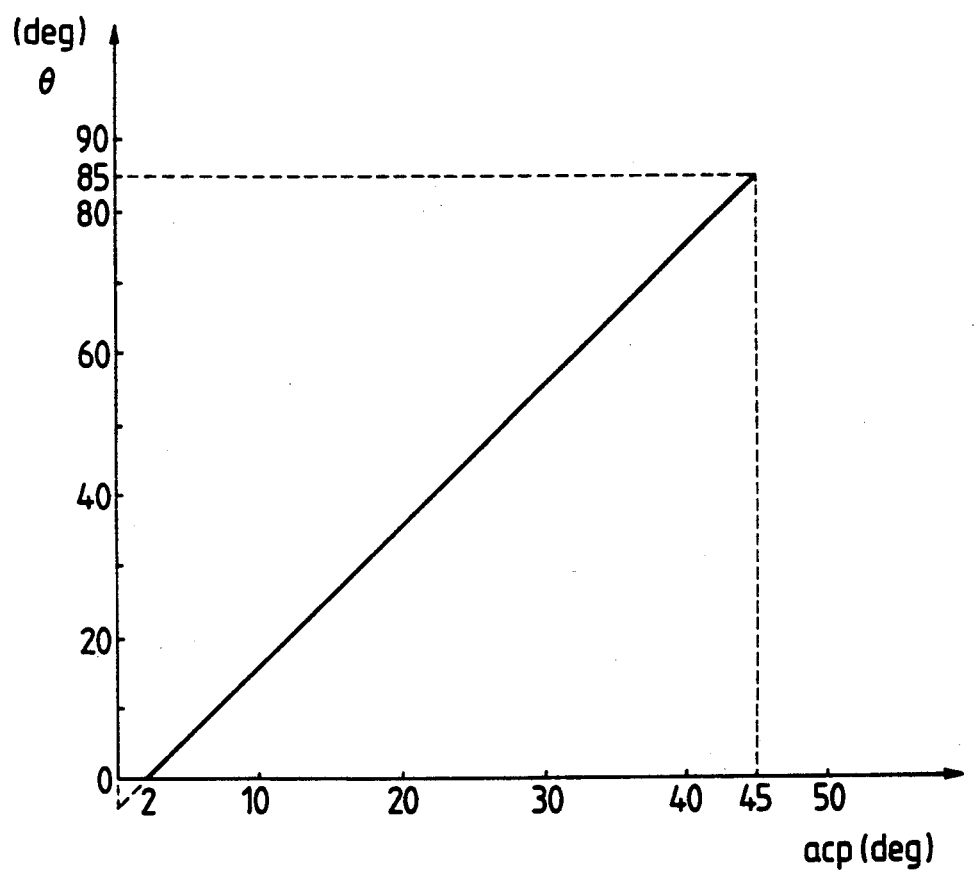
FIG. 2 is a graphic diagram showing the relation between the gear position of a reduction device of the FIG. 1 automotive cruise control system and the opening degree of a throttle valve of the motor vehicle.

Illustrated at numeral 25 is an actuator sensor which is coupled to the reduction device 20 in order to sense the opening degree of the throttle valve 23 on the basis of the gear position acp of the reduction device 20 in accordance with an opening degree-to-gear position relation as shown in FIG. 2. As obvious from FIG. 2, when acp=2 (deg), the throttle valve opening degree $\theta$ is arranged to take zero (deg). This is for the purpose of preventing undesirable running of the motor vehicle by surely setting the throttle valve 23 opening degree 8 to the fully closed state when the gear position of the reduction device 20 takes the fully closed position. Further, when acp=45 (deg), $\theta$ assumes 85 (deg). That is, the throttle valve opening degree $\theta$ does not take the fully closed state even if the gear position acp takes the fully closed position, thereby preventing damages of a stopper of the throttle valve 23. Here, the throttle valve opening degree $\theta$ can be calculated in accordance with the following equation.

$$\theta = \frac{85}{43} (acp - 2)$$

The ECU 10 is responsive to a vehicle speed sensor 26 which senses a speed of the motor vehicle on the basis of a speed of a non-driven wheel 27. In addition, the ECU 10 is coupled to a command apparatus 28 so as to be responsive to a setting signal and a cancellation signal therefrom. The command apparatus includes a main switch, a set switch, a resume switch, a cancellation switch and others.

In this embodiment, the on-line identification is based on the recursive least squares method. The recursive least squares method is described in detail in "Digital Control" written by Yasundo Takahashi and published by Iwanami Shoten in 1985, for example. A brief description will be made hereinbelow in terms of the recursive least squares method for the on-line identification.

Because actuator system control is digitally performed in a microcomputer, an actuator system model can be expressed by the following pulse transfer function G(z).

$$G(z) = \frac{b_1 z^{-1} + b_2 z^{-2} + \ldots b_{n-1} z^{-n+1} + b_n z^{-n}}{1 + a_1 z^{-1} + \ldots + a_{n-1} z^{-n+1} + a_n z^{-n}}$$

In this embodiment, under the condition of n=1, a first-order pulse transfer function Ga(z) can be expressed as follows. The second or more order pulse transfer functions can be expressed similarly.

$$Ga(z) = \frac{\theta(z)}{U(z)} = \frac{bz^{-1}}{1 + az^{-1}}$$

where $z^{-1}$ represents an operator indicating a delayed time corresponding to one sampling time.

The actuator system identification is to estimate the coefficients a and b in the above-mentioned equation. Thus, the coefficients a and b are expressed as a vector as follows:

$$F^T = (-a, b)$$

and the control input and output amounts are handled as a vector as follows:

$$X^T = [\theta(j-1), u(j-1)]$$

where superscript T indicates the transposed matrix.

With the above-expressions, the estimated F' of F is given by the following $$F'(k+1) = F'(k) + F(k+1) \cdot \{\theta(k+1) - \theta'(k+1)\} \quad (1)$$

where $$G(k+1) = (1/WD) \cdot H(k) X(k+1) \quad (2)$$

$$\theta'(k+1) = X^T(k+1) \cdot F'(k) \quad (3)$$

In the equations, W represents a weight, and D and H (k) are respectively given by the following equations:

$$D = 1 + X(k+1) = (1/W) H(k) X(k+1) \quad (4)$$

$$X(k+1) = 1/W) [J - G(k+1) X^T(k+1)] H(k) \quad (5)$$

where J indicates a unit matrix.

Accordingly, the coefficients a and b can be estimated by the above-mentioned equation (1).

Figure 3:
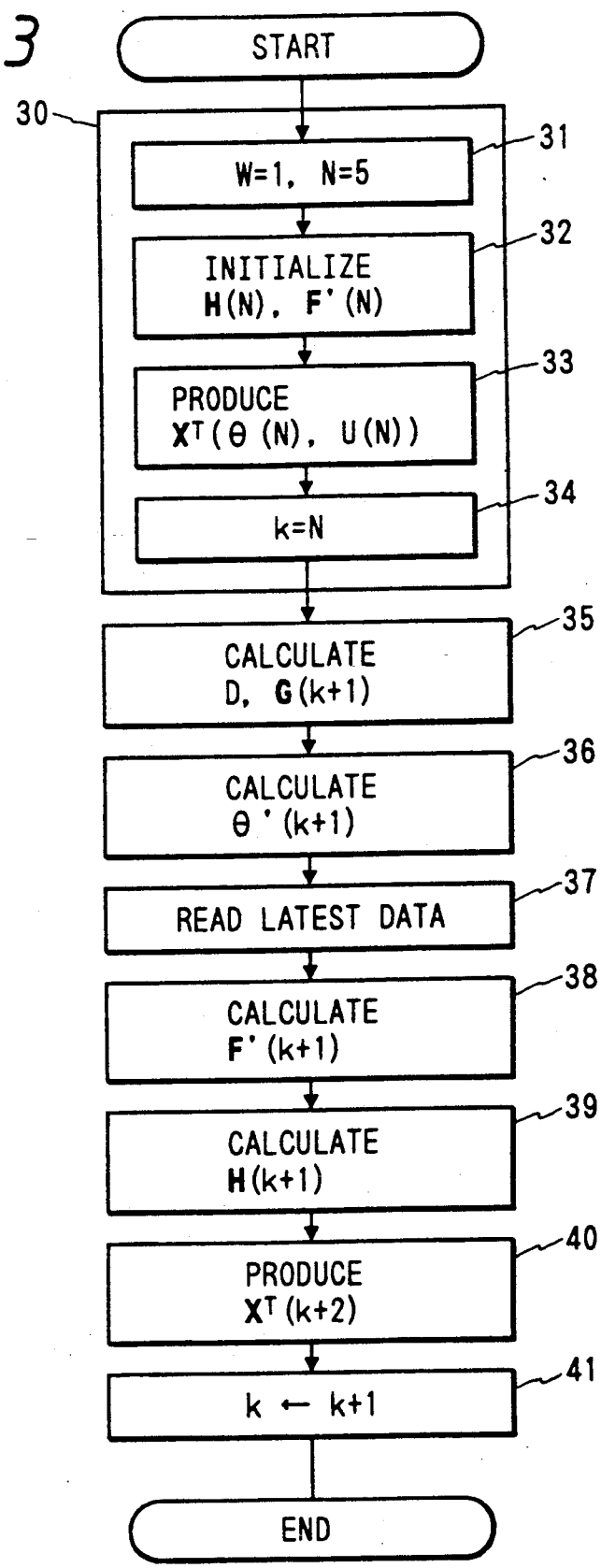
FIG. 3 is a flow chart for describing an operation, particularly on-line identification process, executed by the FIG. 1 automotive cruise control system of the embodiment.

The on-line identification will be described hereinbelow with reference to a flow chart illustrated in FIG. 3. In FIG. 3, a block 30 including steps 31 to 34 is provided in order to perform the initial setting. The step 31 is first executed to set the weight W and a notch N for start of the identification. In this embodiment, they are set as W=1 and N=5. The next step 32 is then executed to initialize H (N) and F' (N). For example, in this embodiment, their initial values are set in accordance with the following equations:

$$H(0) = C \times J$$

$$F'(0) = Z$$

where C represents a positive scalar quantity and Z designates a zero matrix.

The step 33 is subsequently executed to produce $X^T(N+1) = (\theta(N), U(N))$ on the basis of the input and output data, then followed by the step 34 so as to substitute the notch N for the start of the identification into a variable k representing the number of times of sampling.

The operational flow advances from the block 30 to a step 35 to calculate D in accordance with the above-mentioned equation (4) so as to calculate G (k+1) in accordance with the above-mentioned equation (2). The step 35 is followed by a step 36 in order to calculate $\theta'(K+1)$ in accordance with the equation (3) and further followed by a step 37 to input the latest control input and output amounts u(k+1) and $\theta(k+1)$. Subsequently, a step 38 is executed to calculate F'(k+1) by the equation (1) so as to obtain the coefficients a and b. After the execution of the step 38, a step 39 is executed in order to calculate H (k+1) in accordance with the equation (5) and a step 40 is then executed to produce $X^T(k+2)$ and finally a step 41 is executed to add 1 to the variable k. The above-described steps 35 to 41 are repeatedly executed until desirable coefficients a and b are obtained.

Further, a vehicle-system model can be expressed by the following pulse transfer function G(z).

$$G(z) = \frac{b_1 z^{-1} + b_2 z^{-2} + \ldots b_{n-1} z^{-n+1} + b_n z^{-n}}{1 + a_1 z^{-1} + \ldots + a_{n-1} z^{-n+1} + a_n z^{-n}}$$

In this embodiment, n is taken as 1, and it is expressed by the following first-order pulse transfer function Gv(z). The second or more order pulse transfer function can be similar.

$$Gv(z) = \frac{spd(z)}{\theta(z)} = \frac{mz^{-1}}{1 + lz^{-1}} \quad (6)$$

Thus, as well as the on-line identification for the above-described actuator-system model, it is possible to estimate the coefficients l and m. The control of the throttle valve 23 based upon the identified actuator-system model is executed with the dead beat control (finite settling time response). The dead beat control is disclosed in detail in "Digital Control System" written by Benjamin C. Kure, translated by Katsuhisa Yoshida and Michio Nakano and published by Holt-Saunders Japan in 1984.

Figure 4:
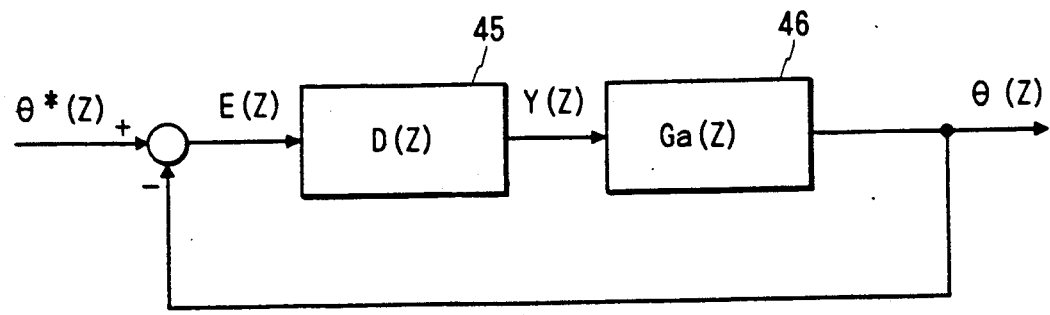
FIG. 4 is a block diagram showing an arrangement of a throttle servo.

FIG. 4 is a block diagram showing a throttle servo. In FIG. 4, $\theta^*(z)$ represents a target throttle valve opening degree, $\theta(z)$ designates a throttle valve opening degree and E(z) $(=\theta^*(z)-\theta(z))$ denotes the throttle valve opening degree deviation. Further, D(z) in a block 45 represents a pulse transfer function of a compensating element which acts as a controller to be designed and Ga(z) denotes a pulse transfer function of the identified actuator-system. In this embodiment, the target throttle valve opening degree $\theta^*(z)$ is designed as a unit step input. Otherwise, the target throttle valve opening degree $\theta^*(z)$ is decomposed to unit step signals.

Because of being a unit step signal, the target throttle valve opening degree $\theta^*$ can be expressed as follows:

$$\theta^*(z) = \frac{z}{1-z} \quad (7)$$

Further, the steady-state deviation Es is expressed in accordance with the following equation.

$$Es = \lim_{z \to 1} \frac{z-1}{z} \{1 - W(z)\}\theta^*(z) \quad (8)$$

where W(z) is a pulse transfer function of the throttle servo.

The steady-state deviation Es can be expressed as follows due to the above-mentioned equations (2) and (3)

$$Es = \lim_{z \to 1} \frac{z-1}{z} \{W(z) - 1\} \frac{z}{z-1} = W(1) - 1$$

Thus, in order for causing the steady-state deviation Es to become zero, the following relation is required to be satisfied.

$$W(1)=1$$

For satisfying the aforementioned equation, $W(z)-1$ has a factor of $z^{-1}$. Further, for the finite time response of the throttle servo, the pulse transfer function W(z) of the throttle servo is required to be expressed as finite order polynomial in terms of $z^{-1}$. Thus, W(z) is determined as expressed by the following equation.

$$W(z) = z^{-1} \quad (9)$$

This indicates that the throttle valve opening degree is coincident with the target throttle valve opening degree $\theta^*(z)$ at a sampling time. The pulse transfer function D(z) of the compensating element realizing the pulse transfer function W(z) is given in accordance with the following equation.

$$D(z) = \frac{1}{Ga(z)} \times \frac{W(z)}{1 - W(z)} = \frac{1}{Ga(z)} \times \frac{z^{-1}}{1 - z^{-1}}$$

Here, since $$Ga(z) = \frac{bz^{-1}}{1 + az^{-1}}$$

the aforementioned equation is rewritten as follows.

$$D(z) = \frac{z^{-1}}{\frac{b}{z+a}(1-z^{-1})}$$

$$= \frac{z^{-1}(z+a)}{b(1-z^{-1})} = \frac{1 + az^{-1}}{b(1-z^{-1})}$$

A more detailed relation for realizing the aforementioned equation by a digital computer or the like is attained as follows, $$Y(z) = \frac{1 + az^{-1}}{b(1-z^{-1})} E(z)$$

with multiplication of b $(1-z^{-1})$ with respect to both sides, the aforementioned equation is rewritten as follows, $$b(1-z^{-1}) Y(z) = (1+az^{-1}) E(z),$$

that is, $$b(y(k) - y(k-1)) = e(k) + ae(k-1)$$

$$y(k) = y(k-1) + \frac{1}{b} e(k) + \frac{a}{b} e(k-1)$$

where y(k) represents the output value of the compensating element, y(k−1) designates the previous output value of the compensating element, e(k) denotes the throttle valve opening degree deviation value, and e(k−1) is the previous value of the throttle valve opening degree deviation.

With the above-described processes, it is possible to realize the dead beat control of the actuator-system. That is, the throttle servo can be constructed such that the throttle valve opening degree follows the target throttle valve opening degree.

A description will be made hereinbelow in terms of the vehicle speed servo. The vehicle speed servo is based upon the state feedback control to which a discrete-time-system integrator is added. The discreate-time-system-integrator-added state feedback control is disclosed in detail in "Digital Control" written by Yasundo Hakahashi and published by Iwanami Shoten in 1985, for example.

Figure 5:
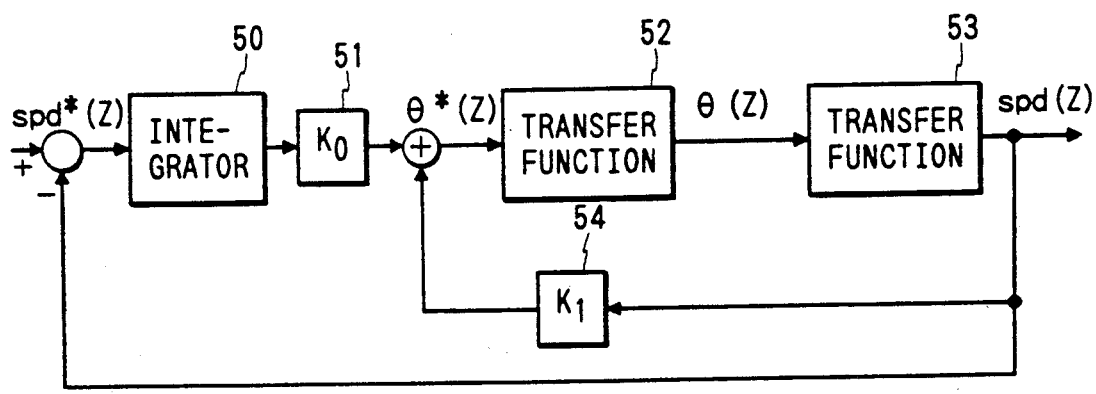
FIG. 5 is a block diagram showing an arrangement of a speed servo.

FIG. 5 is a block diagram showing the vehicle speed servo. In FIG. 5, an integrator and feedback gains K0 and K1 are provided as a controller. A block 50 represents an integrator for integrating the speed deviation, a block 51 designates a feedback gain to be multiplied by the output of the block 50 integrator, a block 52 is a transfer function of the above-described throttle servo, and a block 53 denotes a transfer function obtained on the basis of a vehicle-system model. Still further, a block 54 is a feedback gain to be multiplied by the vehicle speed spd(z). Here, spd*(z) represents a target vehicle speed.

The block 50 integrator is expressed as follows with a pulse transfer function.

$$G_1(z) = \frac{1}{1 - z^{-1}}$$

Here, the processing period of the vehicle speed servo is longer than that of the throttle servo. For example, in this embodiment, the processing period of the throttle servo is 5 msec, while the processing period of the vehicle speed servo is 160 msec.

Although the pulse transfer function of the block 52 throttle servo is expressed by the equation (9), this equation is connection with the processing time of the throttle servo, and since it can be considered that the vehicle speed servo processing time sufficiently follows the target value, the pulse transfer function of the throttle servo can be approximated with the following equation.

$$W(z) = 1$$

Figure 6:
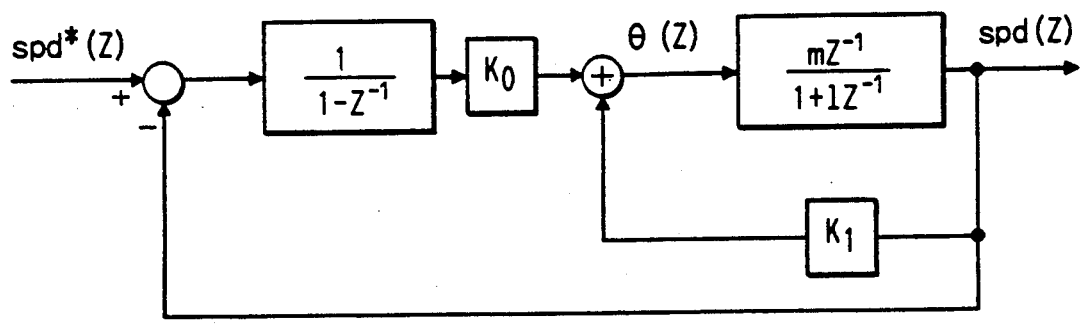
FIG. 6 is a block diagram for describing a speed servo of this embodiment.

Thus, the FIG. 5 arrangement results in being as illustrated in FIG. 6. Although as a method of obtaining the feedback gains Ko and K1 from a vehicle-system model are a method based on an evaluation function and a method based on a pole placement, in this embodiment, the feedback gains Ko and K1 necessary during the control execution are obtained by means of the pole placement method. Moreover, the initial values of the feedback gains Ko and K1 are obtained by an evaluation function. At this time, the feedback gains Ko, K1 are so-called optimal regulator gains and the feedback system is referred to as an optimal regulator system.

The pulse transfer function Gf(z) of the vehicle speed servo from the target vehicle speed spd*(z) to the vehicle speed spd(z) is as follows.

$$Gf(z) = \frac{spd(z)}{spd^*(z)} = \frac{mKo\, z}{z^2 + \{l - 1 + m(Ko - K1)\} - l + mK1}$$

Thus, the characteristic equation of the vehicle speed servo becomes as follows.

$$z^2 = \{l-1+m(Ko-K1)\}\, z - l + mK1 = 0$$

that is, $$z^2 + \alpha_1 z + \alpha_2 = 0$$

where $$\alpha_1 = l - 1 + m(Ko - K1)$$

$$\alpha_2 = -l + mK1$$

Accordingly, the feedback gains Ko and K1 can be obtained as follows, $$Ko = \frac{1 + \alpha_1 + \alpha_2}{m} \quad (10)$$

$$K1 = \frac{1 + \alpha_2}{m} \quad (11)$$

where l and m are coefficients in the vehicle-system transfer function.

As a result, if the constants a $\alpha_1$ and $\alpha_2$ are determined, it is possible to obtain the feedback gains Ko and K1.

Here, a description will be made hereinbelow in terms of obtaining the constants $\alpha_1$ and $\alpha_2$. The pole placement method is a method of designing a control system by designating an eigenvalue when the control system takes a desirable behavior. The eigenvalue means a root of the characteristic equation, and hence the feedback gains Ko and K1 can be obtained in accordance with the above-mentioned equations (10) and (11) if the relation between the constants $\alpha_1$, $\alpha_2$ and the root is obtained.

Since In this embodiment the characteristic equation of the vehicle speed servo is a second-order equation, the following two cases can be considered in terms of the designation of the root.

(1) in the case of a pair of conjugate complex roots $$z = p + qj$$

where p and q are values to be determined in accordance with the control specification. Further, j ($=\sqrt{-1}$) represents an imaginary number. Accordingly, the characteristic equation of the vehicle speed servo becomes as follows.

$$(z-p-qj)(z-p+qj)=0$$

that is, $$z^2 - 2pz + (p^2+q^2) = 0$$

as a result, $$\alpha_1 = -2p \text{ and } \alpha_2 = p^2 + q^2$$

(2) in the case of two real roots $$z = r1, r2$$

where r1 and r2 are values to be determined in accordance with the control specification. Thus, the characteristic equation of the vehicle speed servo becomes as follows.

$$(z-r1)(z-r2)=0$$

as a result, $$\alpha_1 = -r1 - r2 \text{ and } \alpha_2 = r1\, r2$$

Secondly, the root designation on the vehicle speed servo in this embodiment will be described hereinbelow.

Since the control is executed by means of a microcomputer, although it is a discrete system, in this embodiment the root in the case of taking the desirable behavior is obtained by means of a continuous system and further the root in the discrete system is obtained by dispersing the obtained root.

Figure 7:
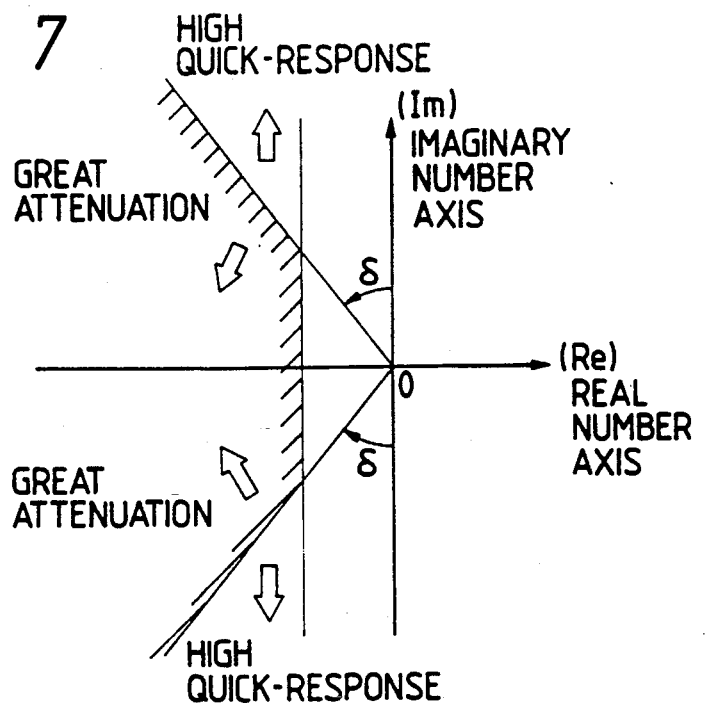
FIG. 7 is a graphic illustration for describing the characteristic of a control system based upon the pole placement method.

In the continuous system the range of the roots by which the control system takes a desirable behavior is generally indicated by oblique lines in FIG. 7. As the imaginary part of the root becomes greater, the quick-response is increased, and further the overshooting amount is increased. Moreover, as the attenuation coefficient, i.e., the ratio of the imaginary part and real part of the root, becomes greater, the relative stability, i.e., the attenuation characteristic, becomes more improved. The attenuation coefficient can also be expressed by $\sin\delta$.

In the general servo systems, the attenuation coefficient may be set to about 0.6 to 0.8. However, in the vehicle constant-speed travelling control system, the attenuation coefficient is determined to be close to 1 because of requiring the quick-response without overshooting.

Figure 8:
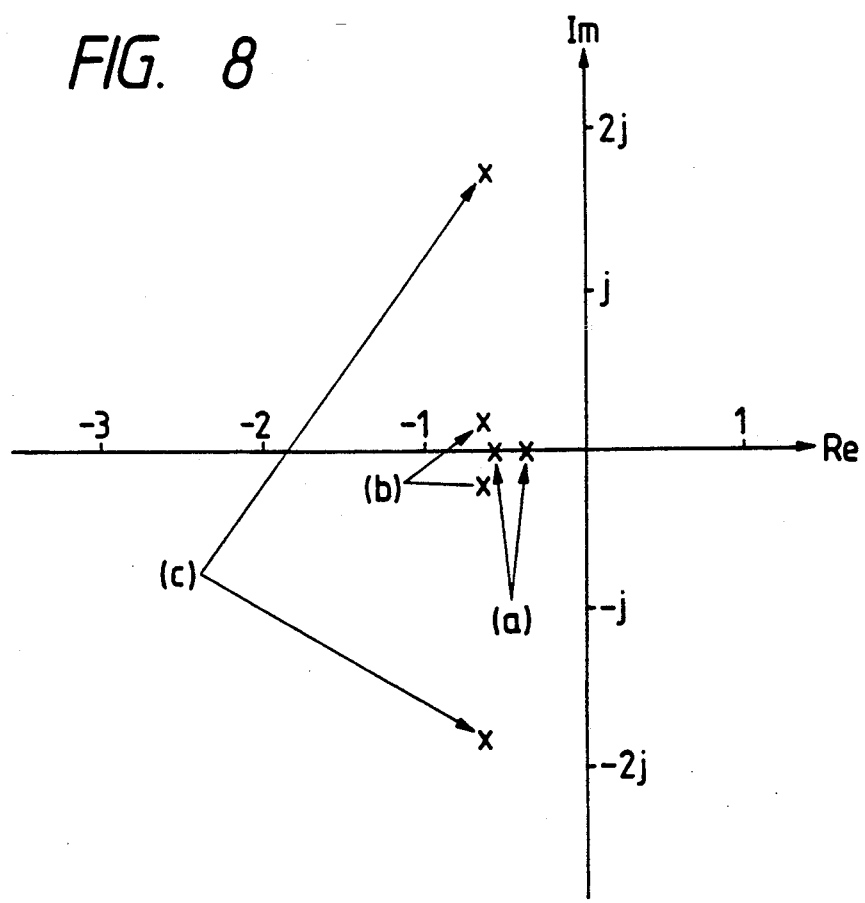
FIG. 8 is a graphic diagram for describing the pole placement of roots in this embodiment.
Figure 9:
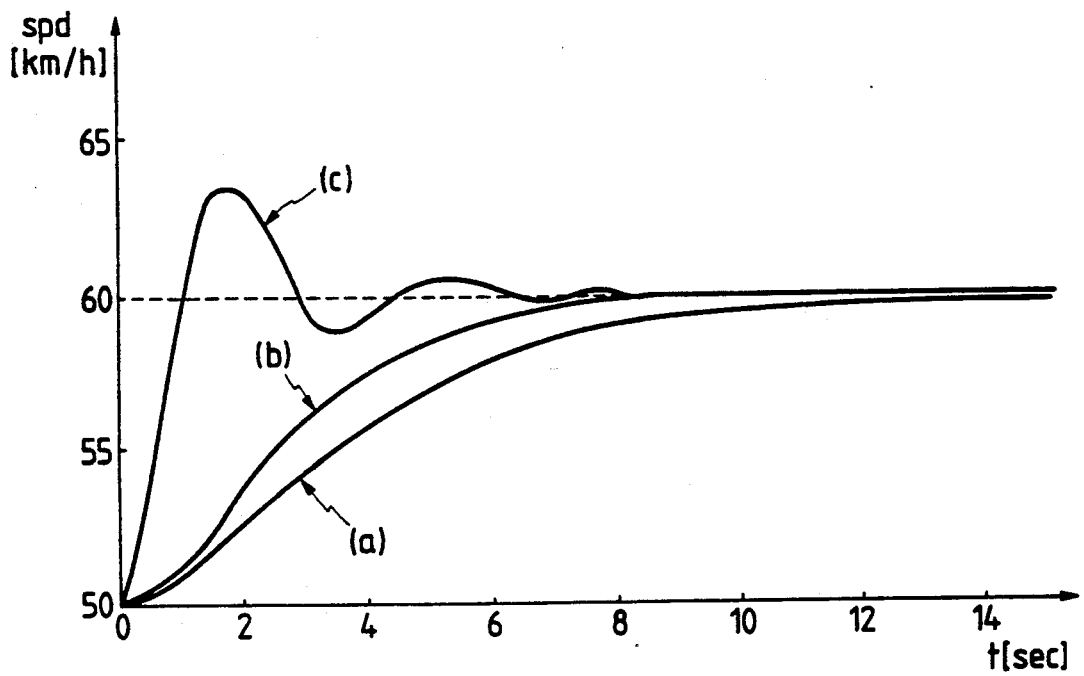
FIG. 9 is a graphic illustration of response characteristics.

Here, a method of selecting three roots will be described hereinbelow. In FIG. 8, (a) represents two real roots $-0.4$ and $-0.6$, (b) denotes conjugate complex numbers $-0.6 \pm j0.2$, and (c) depicts conjugate complex numbers $-0.6 \pm j1.8$. FIG. 9 shows the respective roots when the target vehicle speed is stepwise increased from 50 km/h to 60 km/h. In FIG. 9, in the case of (a), the attenuation is great, while the quick-response is low and the speed rising is slow In the case of (c), the speed rising is quick because the quick-response is high, while a great overshooting occurs. Further, in the case of (b), the speed rising is quicker as compared with (a) and the overshooting does not occur unlike (c). Thus, this embodiment takes aim at the response of (b). The conjugate complex numbers $-0.6 \pm j0.2$ in (b) are the roots in the continuous system. When the root in the continuous system is taken as $S = \sigma + j\omega$, the root z in the discrete system becomes as follows.

$$z = e^{TS(\sigma+J\omega)} = e^{\sigma T}\cos \omega T + je^{\sigma T}\sin \omega T$$

where T represents a processing time. When T=0.16 (sec), $\sigma = -0.6$ and $\omega = \pm 1.8$, the aforementioned equation becomes as follows.

$$z = e^{-0.6 \times 0.16}\cos(\pm 1.8 \times 0.16) + je^{-0.6 \times 0.16}\sin(\pm 1.8 \times 0.16) = 0.908 \pm j0.029$$

Thus, in this embodiment, $\alpha_1$ and $\alpha_2$ can be determined as follows.

$$\alpha_1 = -1.816 \text{ and } \alpha_2 = -0.825$$

Figure 10:
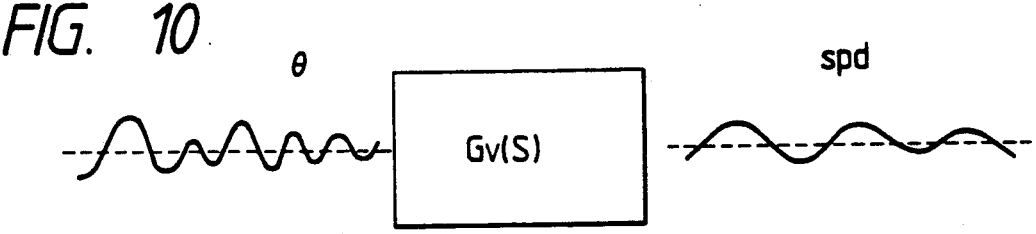
FIG. 10 is a block diagram for describing a technique for obtaining the initial value of the vehicle-speed servo.

Subsequently, a description will be made hereinbelow in terms of the initial values of the vehicle speed servo, i.e., the initial values of the above-mentioned feedback gains Ko and K1, which will be set in advance in design. Here, the initial values are set as average values which can be employed for any kinds of motor vehicles. For example, in this embodiment, as obvious from FIG. 10, the vehicle-system model Gv(s) for obtaining the initial values is obtained on the basis of the throttle valve opening degree $\theta$ and the vehicle speed spd in accordance with the least squares method.

With this method, the continuous-time system vehicle-system model (Gv(s)) can be expressed in accordance with the following equation.

$$Gv(s) = \frac{10.311}{1 + 22.516S} \quad (12)$$

In accordance with the aforementioned equation, the evaluation function is solved so as to design an integral optimal regulator system, so that the optimal regulator gains at the time are used as the initial values for the vehicle speed servo. A designing method of such an integral optimal regulator is disclosed in detail in "Mechanical System Control" written by Katsuhisa Furuta and published by Ohm Sha in 1984). Here, a description will be made in terms of the integral optimal regulator designing method.

Figure 11:
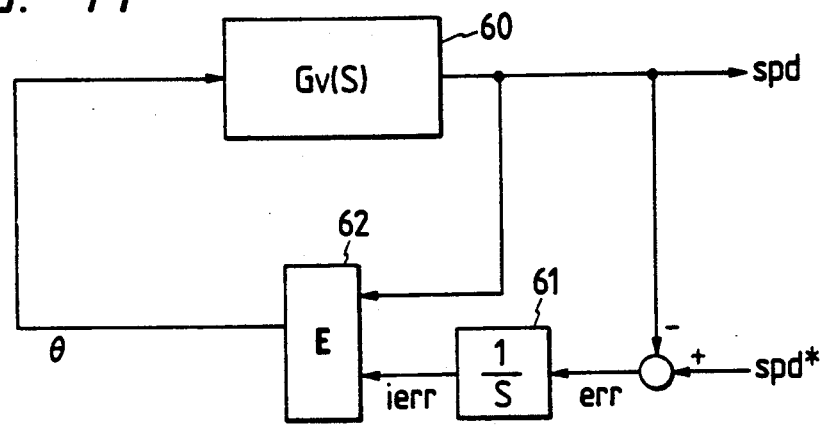
FIG. 11 is a block diagram showing a continuous-time system integral optimal regulator.
Figure 12:
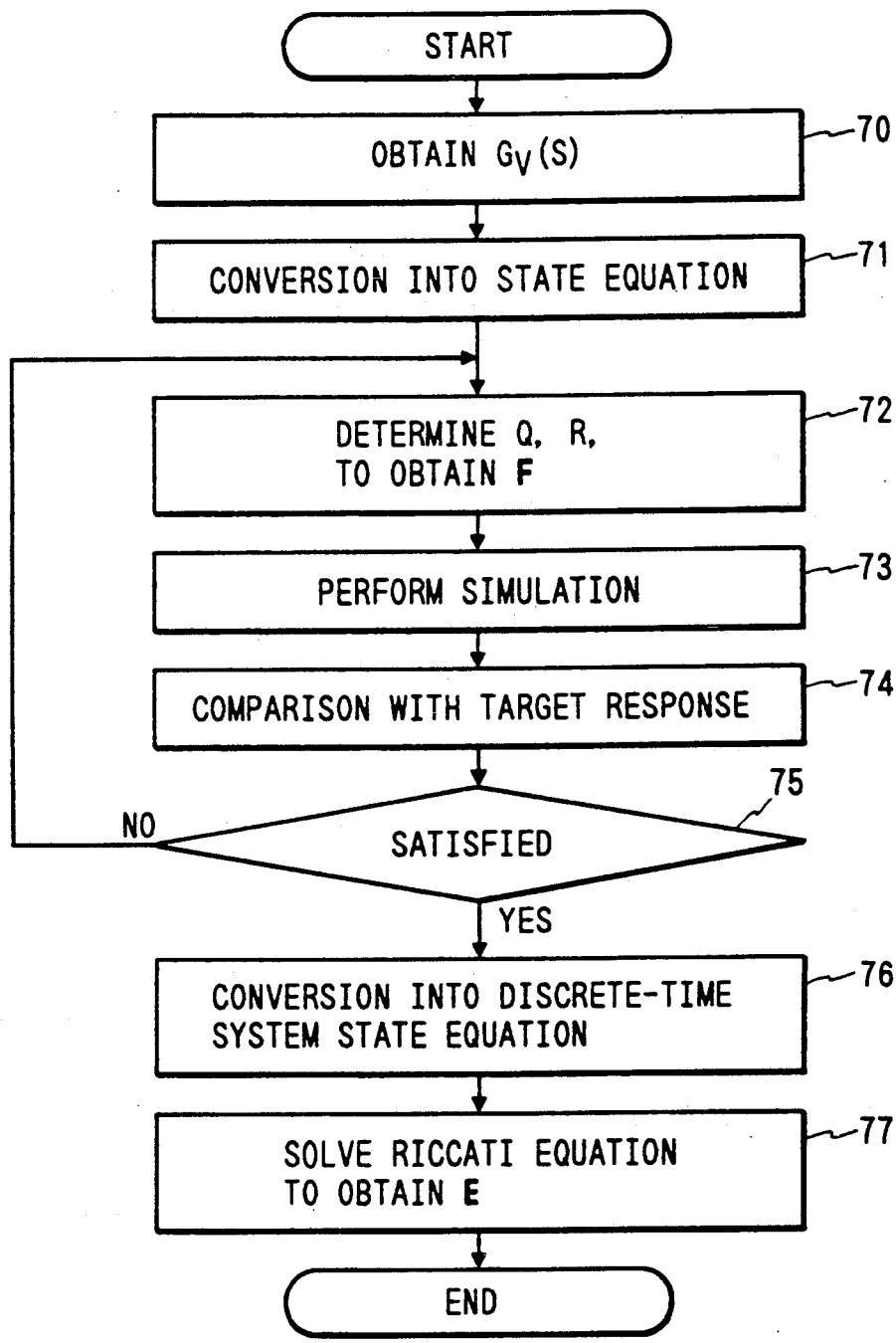
FIG. 12 is a flow chart for describing the initial value setting in the vehicle-speed servo.

FIG. 11 is a block diagram showing a continuous-time system integral optimal regulator. In FIG. 11, a block 60 represents a model Gv(s), a block 61 designates an integrator, and a block 62 is an optimal regulator gain E to be obtained. Further, err denotes a deviation between the vehicle speed spd and the target vehicle speed spd*, ierr is a deviation integration obtained by integrating the deviation err, and b represents the throttle valve opening degree. The description will be made hereinbelow with reference to FIG. 12. In FIG. 12, a step 70 is first executed in order to obtain the continuous-time system vehicle system model (Gv(s)) in accordance with the method illustrated in FIG. 10. A step 71 follows to perform conversion into the following continuous-time system state equation.

$$\begin{pmatrix} \dot{spd} \\ \dot{ierr} \end{pmatrix} = \begin{pmatrix} -0.0444 \\ -1.0 \end{pmatrix}\begin{pmatrix} spd \\ ierr \end{pmatrix} + \begin{pmatrix} 0.458 \\ 0 \end{pmatrix}\theta + \begin{pmatrix} 0 \\ 1.0 \end{pmatrix}spd^*$$

$$A = \begin{pmatrix} -0.0444 \\ -1.0 \end{pmatrix} \quad B = \begin{pmatrix} 0.458 \\ 0 \end{pmatrix}$$

where $\dot{spd}$ and $\dot{ierr}$ represent the time differentiations of spd and ierr.

Thereafter, a step 72 is executed so as to appropriately determine weights Q and R to resolve the following continuous-time system Riccati equation.

$$A^T P + PA + Q - PBR^{-1}B^T P = 0 \quad (13)$$

where $R^{-1}$ represents the inverse matrix of R.

Here, P is the positive definite symmetric solution of the Riccati equation which can be obtained by the solution of the equation (13), and the optimal regulator gain E can be obtained by substituting P into the following equation.

$$E = R^{-1}BP$$

After the execution of the step 72, a step 73 is executed to perform a simulation with the obtained optimal regulator gain E, then followed by a step 74 to perform comparison with a target response, still further followed by a step 75 to check whether the condition is satisfied. If the answer in the step 75 is negative, the operational flow returns to the above-described step 72 where the weights Q and R are repeatedly changed until the answer in the step 75 becomes affirmative.

In this embodiment, the weights Q and R are determined as follows.

$$Q = \begin{pmatrix} 8.0 & 0 \\ 0 & 1.0 \end{pmatrix}$$

$$R = 1.0$$

With the Riccati equation being solved by the determination of the weights Q and R, the optimal regulator gain E becomes as follows.

$$E = (3.42 - 1.00) \quad (14)$$

Figure 13:
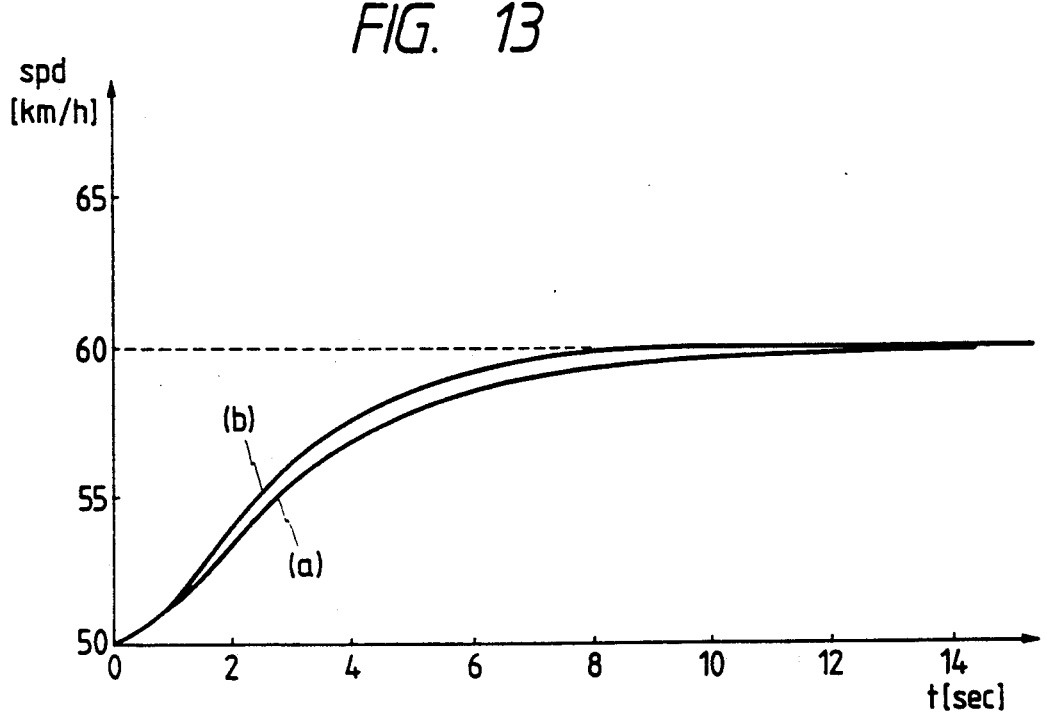
FIG. 13 is a graphic diagram showing the response characteristic of the vehicle-speed servo.

In accordance with the equation (14) and the system state equation, the result of the simulation of variation of the vehicle speed spd due to variation of the target vehicle speed spd* from 50 km/h to 60 km/h becomes as illustrated by (a) in FIG. 13. In FIG. 13, (b) shows the vehicle speed servo response at which the vehicle-system adaptive mechanism aims. That is, the initial value is determined so that the response (a) is lower than the response (b) at which the adaptive mechanism aims. Thus, it is possible to stably control the throttle valve 23 operation from the beginning of the control.

Returning back to FIG. 12, if the answer in the step 75 is affirmative, a step 76 is executed in order to convert the continuous-time system state equation into a discrete-time system state equation at the sampling time T=0.16 (sec).

$$\begin{pmatrix} spd_{k+1} \\ ierr_{k+1} \end{pmatrix} = \begin{pmatrix} -0.9930 \\ -0.1591.0 \end{pmatrix}\begin{pmatrix} spd_k \\ ierr_k \end{pmatrix} + \begin{pmatrix} -0.0730 \\ -0.00585 \end{pmatrix}\theta_k + \begin{pmatrix} 0 \\ 0.16 \end{pmatrix}spd^*$$

where $spd_k$, $ierr_k$, $\theta_k$ spd* represent the vehicle speed spd, deviation integration ierr, throttle opening degree $\theta$ and the target vehicle speed spd* at the time of kth sampling.

Here, the coefficients are determined as follows.

$$U = \begin{pmatrix} 0.9930 \\ -0.1591.0 \end{pmatrix} \quad V = \begin{pmatrix} 0.0730 \\ -0.00585 \end{pmatrix}$$

Further, in a step 77, the following discrete-time system Riccati equation (15) is solved so as to obtain the discrete-time system optimal regulator gain E in accordance with the following equation (16). In this case, the weights Q and R are determined to be equal to those in the continuous-time system.

$$S = Q + U^T S U - U^T S V (R + V^T S V)^{-1} V^T S U \quad (15)$$

where S represents a positive definite symmetric matrix which satisfies the equation (15).

$$E = (R + V^T S V)^{-1} V^T S U \quad (16)$$

If substituting S obtained by the equation (5) into the equation (16), the discrete-time system optimal regulator gain E is obtained as follows.

$$E = (3.08 - 0.882)$$

The optimal regulator gain E thus obtained is used as the control initial value. If resolving into elements, the optimal regulator gain E becomes as follows.

$$K1 = 3.08 \text{ and } Ko = -0.882$$

Figure 14:
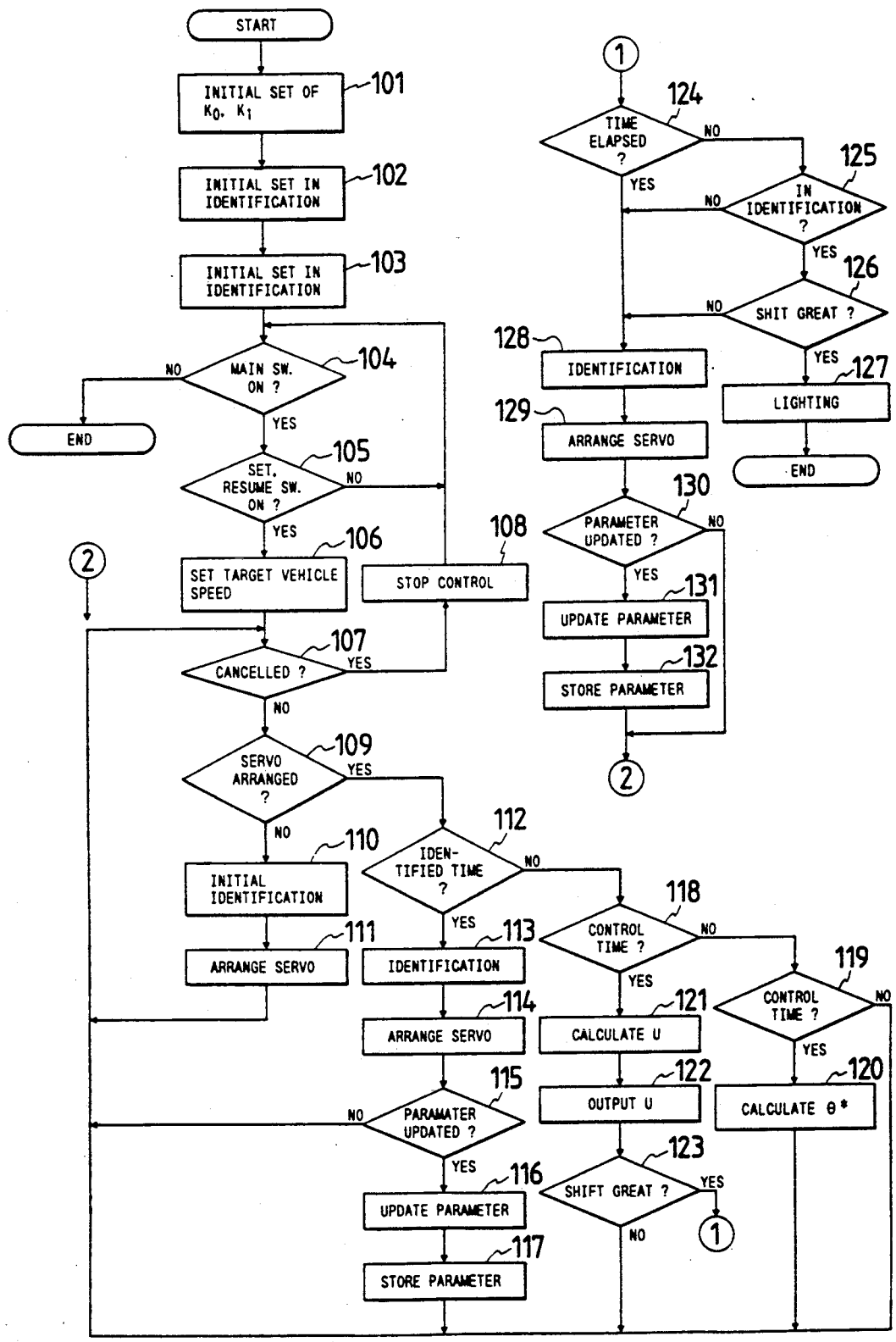
FIG. 14 is a flow chart for describing the automotive cruise control in this embodiment.

The operation of this embodiment will be described hereinbelow with reference to a flow chart of FIG. 14. The FIG. 14 operation is executed in response to turning-on of a main switch of the command apparatus 28 in FIG. 1.

Figure 15:
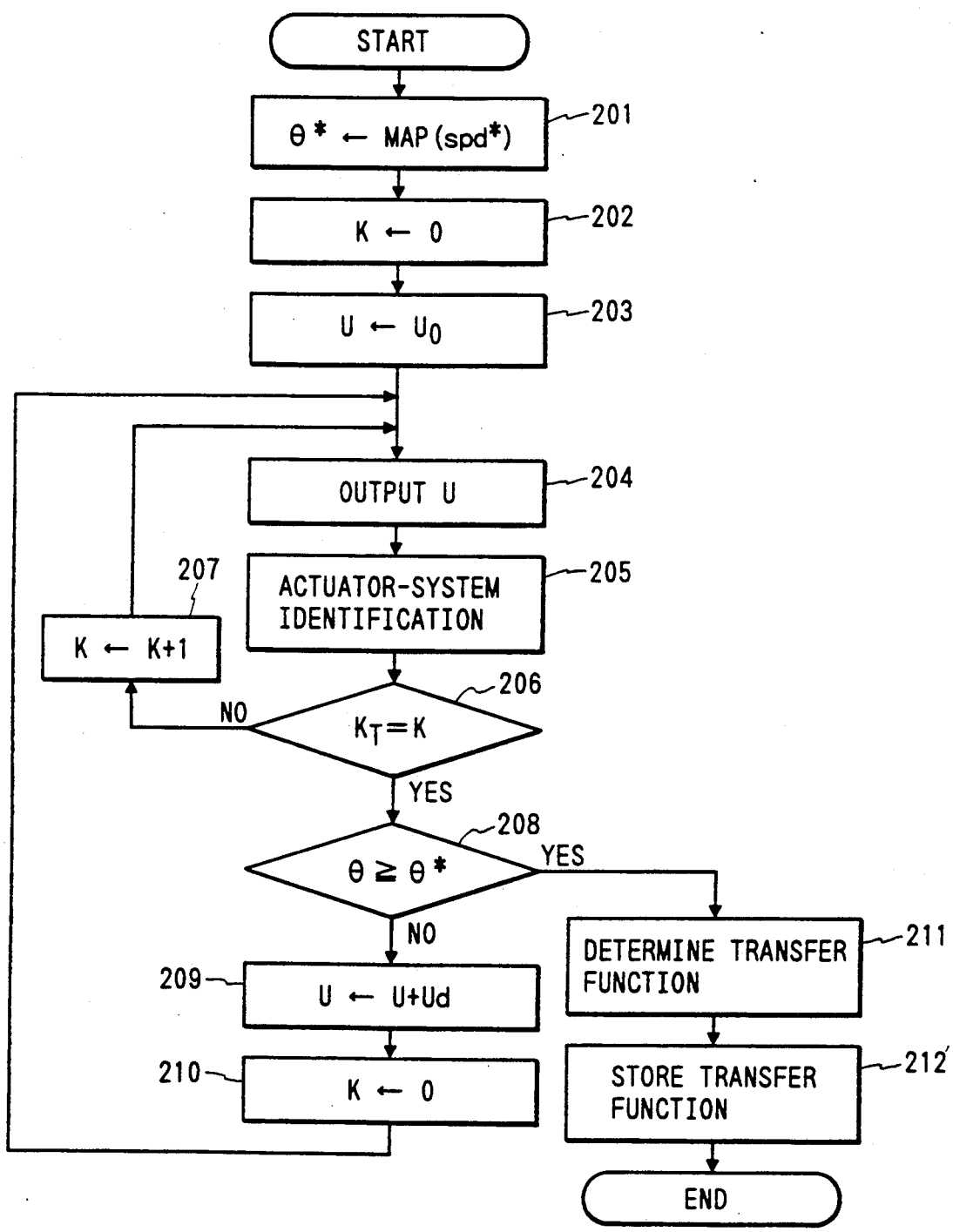
FIG. 15 is a flow chart for describing the initial identification of the actuator system.

A step 101 is first executed to set the initial value of the control constant of the vehicle speed servo. The initial value is obtained as described above and stored in advance in the ROM 14. In this embodiment, $Ko = -0.882$ and $K1 = 3.08$. Subsequently, a step 102 is executed to perform the initial setting in the actuator-system identification, then followed by a step 103 to perform the initial setting in the vehicle-system identification. The initial setting in the identification means the process of the step 30 in FIG. 3. The operation then goes to a step 104 to check whether the main switch is ON or Off. If the answer in the step 104 is negative, the operation is terminated. If the answer in the step 104 is affirmative, the operation advances to a step 105 to check whether the set switch and the resume switch are in the ON or OFF state. If the both the switches are in the OFF states, the operational flow returns to the above-mentioned step 104 to again perform the process. On the other hand, if either of the switches is in the ON state, the operation goes to a step 106 in order to set the target vehicle speed spd*. Here, in the case that the set switch is ON, the actual vehicle speed spd when the set switch is turned on is set to be the target vehicle speed spd* In the case that the resume switch is turned on, the target vehicle speed spd* set at the time of the previous automotive cruise control is directly set to be the target vehicle speed spd* in the present constant-speed travelling control. Thereafter, a step 107 follows to check whether the constant-speed travelling control execution is cancelled. The cancellation is made under the condition that, for example, either the braking switch, clutch switch or parking brake switch is in the ON state. If the cancellation condition is satisfied, the operation goes to a step 108 to perform the control cancelling process (the clutch 21 is cut off and the gear position of the reduction device 20 is taken to be in the fully closed position). After the execution of the step 108, the operational flow returns to the above-mentioned step 104 to again perform the above-described processes. On the other hand, if the cancellation condition is not satisfied, the operation advances to a step 109 in order to check whether the throttle servo is arranged. If the throttle servo is not arranged, a step 110 follows to perform the initial identification of the actuator system. During the actuator system initial identification process, the constant-speed travelling control is performed by the open-loop control. The process in the step 110 will be described hereinbelow with reference to a flow chart of FIG. 15.

Figure 16:
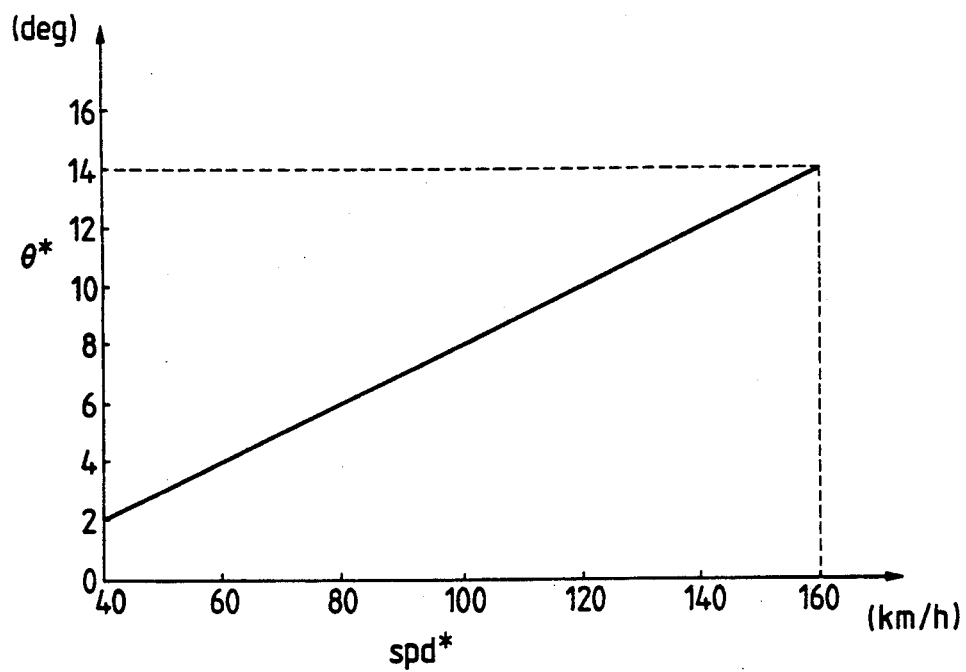
FIG. 16 is a graphic diagram showing the relation between the target vehicle speed and target throttle valve opening degree in the open-loop control.
Figure 17:
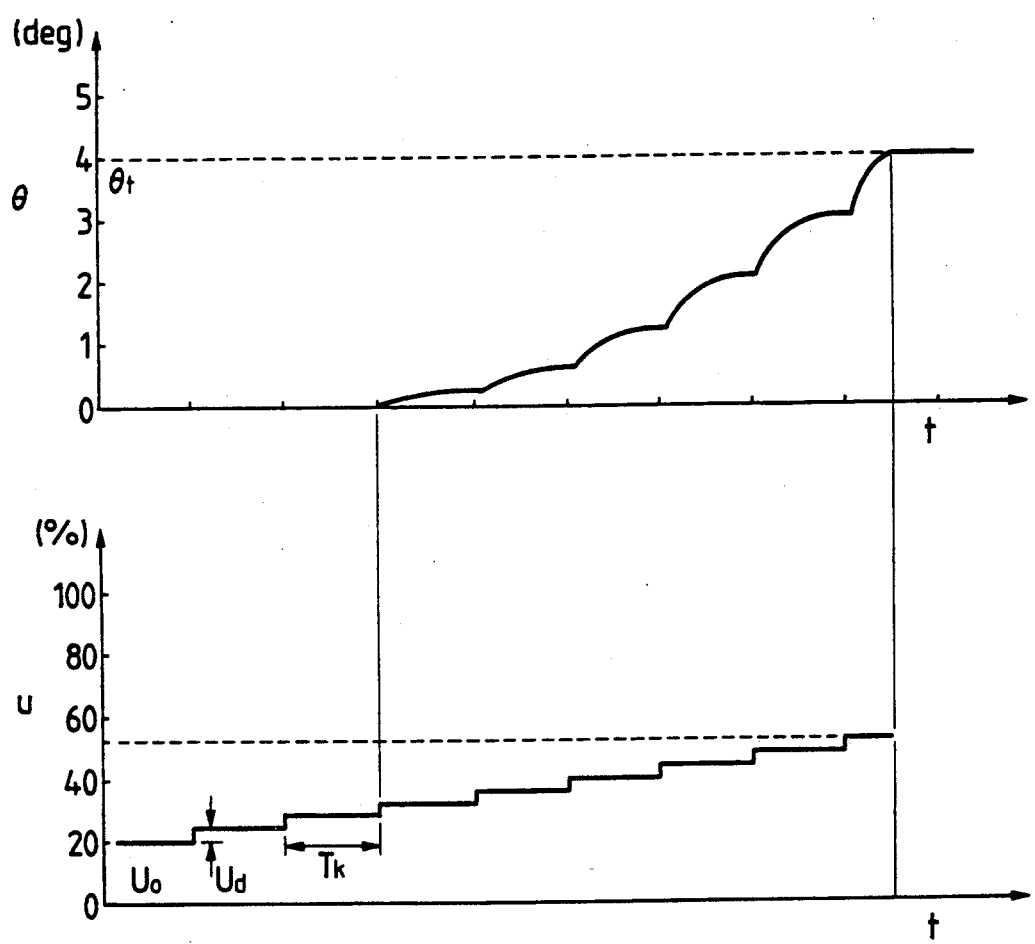
FIG. 17 is a timing chart for describing the automotive cruise control based on the open-loop control.

A step 201 is first executed to obtain a target throttle valve opening degree $\theta^*$ on the basis of the target vehicle speed spd* Here, the target throttle valve opening degree $\theta^*$ corresponding to the target vehicle speed spd* is obtained in accordance with a characteristic as illustrated in FIG. 16. Subsequently, a step 202 is exected to clear a control counter K, then followed by a step 203 to substitute the initial value Uo into the throttle valve control signal U. This throttle valve control signal U is supplied to the motor 19 in a step 204 and further the actuator-system identification (the steps 35 to 41 in FIG. 3) is performed in a step 205. A step 206 follows to check whether the value of the control counter K is a predetermined value $K_T$, i.e., check whether a predetermined time period Tk is elapsed. If the value of the control counter K is smaller than the predetermined value $K_T$, the operation advances to a step 207 in order to add 1 to the value of the control counter K. After the execution of the step 207, the operational flow returns to the above-mentioned steps 204 to 206. On the other hand, if the answer in the step 206 is affirmative, that is, when the value of the control counter K is equal to the predetermined value $K_T$, the operation proceeds to a step 208 so as to check whether the throttle valve opening degree $\theta$ is greater than the target throttle valve opening degree $\theta^*$. When the decision in the step 208 is negative, the operation proceeds to a step 209 to increase the value corresponding to the throttle valve control signal U by a predetermined value Ud so that the throttle valve 23 is additionally opened by a predetermined opening degree. A subsequent step 210 is executed to clear the control counter K. After the execution of the step 210, the operational flow returns to the above-described steps 204 to 208. On the other hand, if the answer in the step 208 is affirmative, that is, when the throttle valve opening degree $\theta$ is greater than the target throttle valve opening degree $\theta^*$, the operation directs to a step 211 to determine the coefficients a and b of the transfer function, then followed by a step 212 to store the coefficents a and b in the Bu-RAM 14. More specifically, before in the step 208 the throttle valve opening degree $\theta$ becomes greater than the target throttle valve opening degree $\theta^*$, the coefficients a and b obtained in the step 205 are respectively averaged and then set as the coefficients a and b. FIG. 17 is a timing chart for understanding the constant-speed travelling control on the open-loop control at the time of the initial identification process of the actuator system. The actuator-system initial identification may be made at the time of the adjustment effected by the maker on shipment and the actuator-system model is in advance stored in the Bu-RAM 14. Thus, the open-loop control for the actuator-system initial identification is not performed at the user sides, thereby resulting in improving the safety.

Returning back to FIG. 14, if the decision in the step 109 is affirmative, that is, when the throttle servo has been arranged, the operational flow goes to a step 112 in order to check whether the vehicle system is at the identification time. If so, the vehicle-system identification is performed in a step 113 (the steps 35 to 41 in FIG. 3). A step 114 is then executed so as to arrange the vehicle servo. More specifically, the control parameters, i.e., the feedback gains Ko and K1, illustrated in FIG. 5 are obtained in accordance with the above-mentioned equations (10) and (11). Thereafter, a step 115 is executed to check whether the control parameters obtained in the previous step 114 are changed. That is, if the control parameter is below a first predetermined value, under the consideration that it is due to an error, the updating of the control parameter is not performed. Further, even if the control parameter is above a second predetermined value sufficiently greater than the first predetermined value, under the consideration that it is due to an abnormality, the updating of the control parameter is not performed. Otherwise, the control parameter is updated in a step 116 and stored in the Bu-RAM 14 in a step 117.

On the other hand, if the decision in the step 112 is negative, the operation goes to a step 118 to check whether the actuator-system is at the control time to calculate the target throttle valve opening degree $\theta^*$. If the answer in the step 118 is affirmative, a step 120 is executed in order to obtain the target throttle valve opening degree $\theta^*$. From the FIG. 6 block diagram, the target throttle valve opening degree $\theta^*$ is expressed as $\theta^*(z)=Ko \cdot ierr(z)+k1 \cdot spd(z)$. This equation is written as follows to have a form suitable for operation of the computer.

$$\theta^*(k)=Ko \cdot ierr(k)+K1 \cdot spd(k)$$

where Ko and K2 are respectively feedback gains, ierr(k) represents the output (deviation integration value) of the integrator at the time of the kth sampling, and spd(k) denotes the vehicle speed at the time of the kth sampling.

Figure 18:
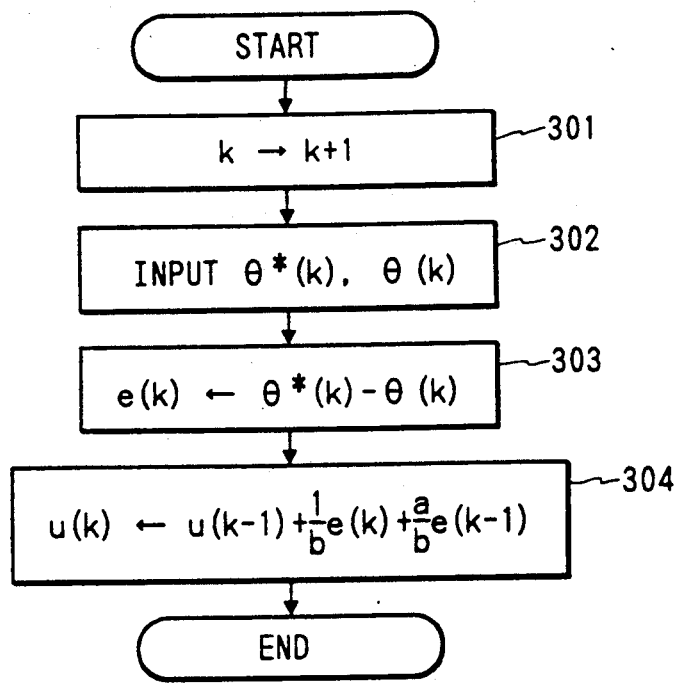
FIG. 18 is a flow chart for describing the calculation of a throttle valve control signal.

If the decision in the step 118 is affirmative, the operation advances to a step 121 to obtain the throttle valve control signal U. A process for obtaining the throttle valve control signal U will be described hereinbelow with reference to a flow chart of FIG. 18. In FIG. 18, a step 301 is first executed to add 1 to a variable k. Here, the variable k is a variable representing the number of times of the sampling. After the execution of the step 301, a step 302 is executed to input the target throttle valve opening degree $\theta^*(k)$ and the throttle valve opening degree $\theta(k)$, then followed by a step 303 so as to obtain the throttle valve opening degree deviation e(k) in accordance with the following equation.

$$e(k)=\theta^*(k)-\theta(k)$$

Thereafter, a step 304 is executed to obtain the throttle valve control signal U in accordance with the following equation.

$$u(k) = u(k-1) + \frac{1}{b} e(k) + \frac{a}{b} e(k-1)$$

Figure 19:
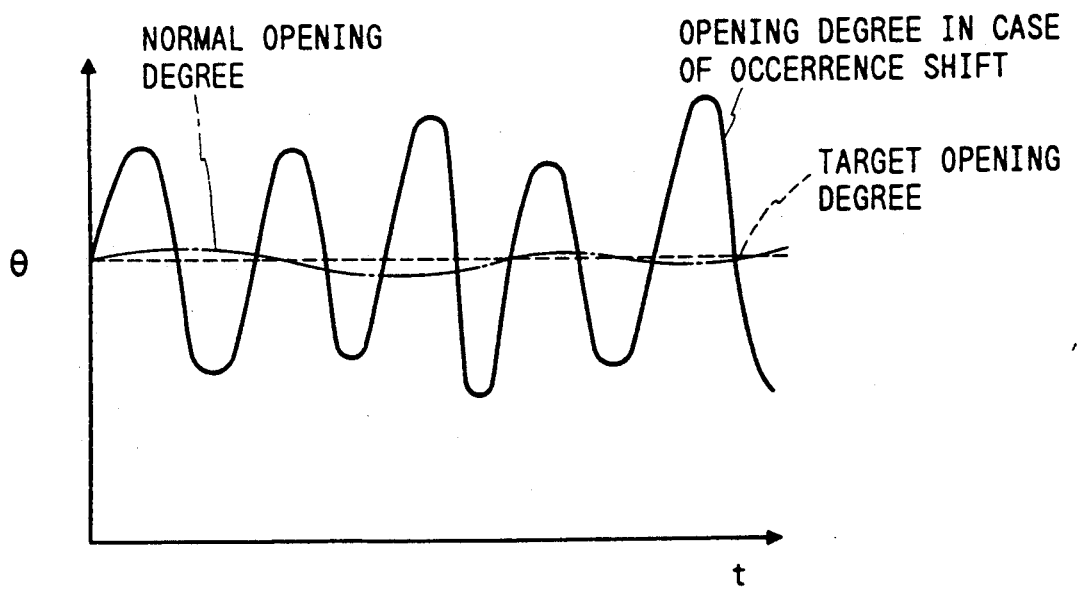
FIG. 19 is a characteristic diagram showing one example of the throttle valve opening degree in the case that the transfer function is shifted.

Returning back to FIG. 14, after the execution of the step 121, a step 122 is executed to output the throttle valve control signal U to the motor 19. A subsequent step 123 is executed to check whether there occurs a difference (shift or deviation) in terms of the transfer function of the actuator system. The characteristic of the throttle valve opening degree with respect to the target throttle valve opening degree in the case of the occurrence of the difference is illustrated in FIG. 19. Thus, in this embodiment, the detection of the difference is performed by checking whether the deviation between the maximum value and minimum value of the throttle valve opening degree is equal to or greater than a predetermined value.

If the decision in the step 123 is "YES", the operation goes to a step 124 to check whether a predetermined time is elapsed after the execution of the identification of the actuator system. If so, the operation advances to a step 128 to perform the identification of the actuator system. If not, a step 125 follows to check whether the actuator system is in the identification operation. If the answer in the step 125 is negative, the operational flow goes to the above-mentioned step 128 to perform the identification of the actuator system. On the other hand, if the answer in the step 125 is affirmative, a step 126 follows to check whether the difference of the actuator system transfer function at the present processing time (the deviation between the maximum and minimum values of the throttle valve opening degrees during a predetermined time period) is greater than that of the actuator system transfer function at the previous processing time. If so, a step 127 follows to light a warning lamp to interrupt the constant-speed travelling control under the consideration that the actuator system enters into an abnormal state. On the other hand, if the answer in the step 126 is negative, the operation goes to a step 128 to perform the identification of the actuator system. Here, the actuator system identification in the step 128 corresponds to the processes executed in the steps 35 to 41 in FIG. 3. The actuator system identification is performed as long as the difference of the actuator system transfer function is detected in the step 123 and is stopped in response to no detection of the difference of the actuator system transfer function. After the execution of the step 128, a step 129 is executed so as to arrange the throttle servo, then followed by a step 130 to check whether it is appropriate to update the parameter (the transfer function of the compensating element D(z)) obtained in the previous step 129. That is, when this control parameter is below a first predetermined value, since it is considered to be due to error, the updating of the control parameter is not performed. Further, when the control parameter is greater than a second predetermined value sufficiently greater than the first predetermined value, since it is considered to be due to abnormality, the parameter is not updated. Otherwise, the control parameter is updated in a step 131. A subsequent step 132 is provided in order to store the control parameter in the Bu-RAM 14.

Figure 20A:
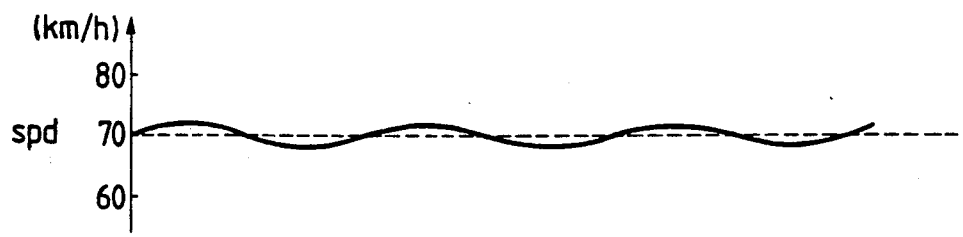
FIG. 20 is a graphic illustration of experiment results obtained by a conventional automotive cruise control.
Figure 20B:
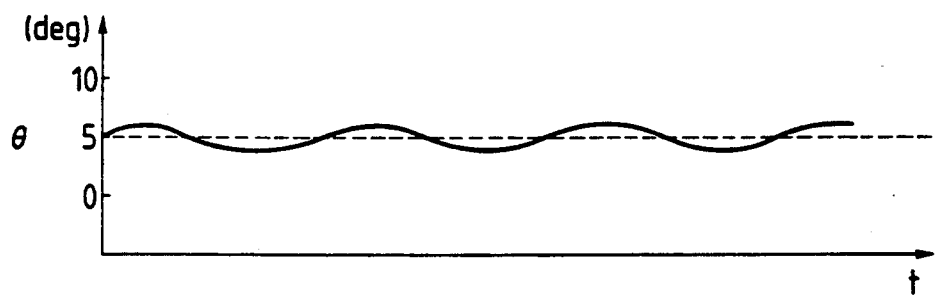
Figure 21A:
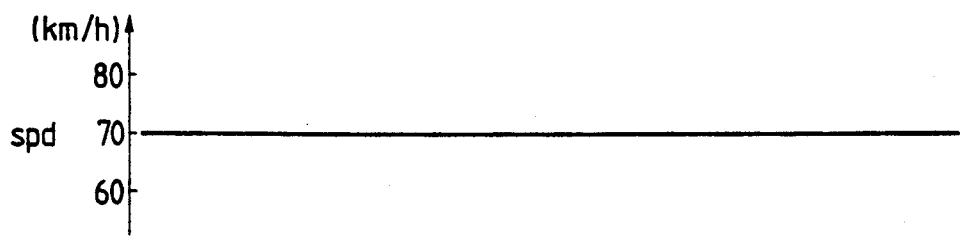
FIG. 21 is a graphic diagram showing experiment results obtained by the automotive cruise control according to this embodiment.
Figure 21B:
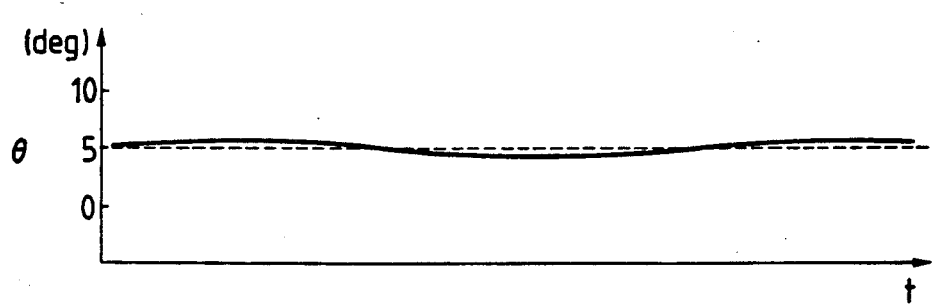

FIGS. 20 and 21 respectively show experiment results of the constant-speed travelling control executed in accordance with a conventional technique with one adative mechanism and this embodiment with two adaptive mechanisms to automatically arrange the throttle servo, under the condition that the motor vehicle runs on a flat road surface with the target vehicle speed being set to 70 km/h. As seen from FIG. 20, according to the conventional technique, since the throttle servo is not constructed, although the speed deviation is in a given range, the throttle valve opening degree frequently varies so that the motor vehicle becomes uncomfortable to drive because of generation of the forward and backward acceleration shocks. On the other hand, according to this embodiment, as obvious from FIG. 21, the throttle valve opening degree quickly follows slight irregularities of the vehicle-running road surface to smoothly varies so that the motor vehicle becomes comfortable to drive. In addition, the vehicle speed deviation is scarcely produced.

Figure 22:
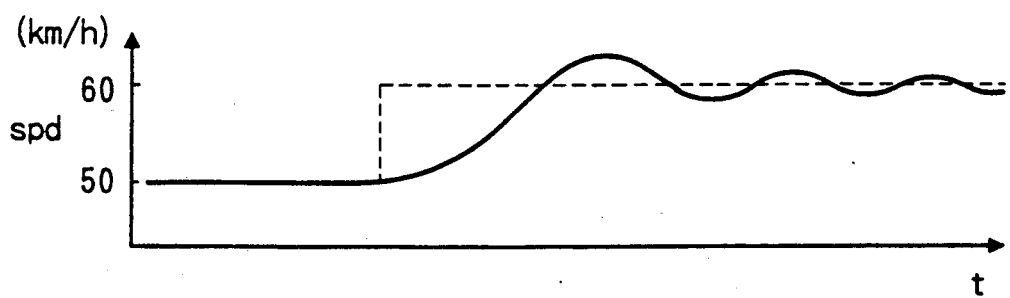
FIG. 22 is a graphic illustration of experiment results obtained under conventional PID control in the case of the resume operation.
Figure 23:
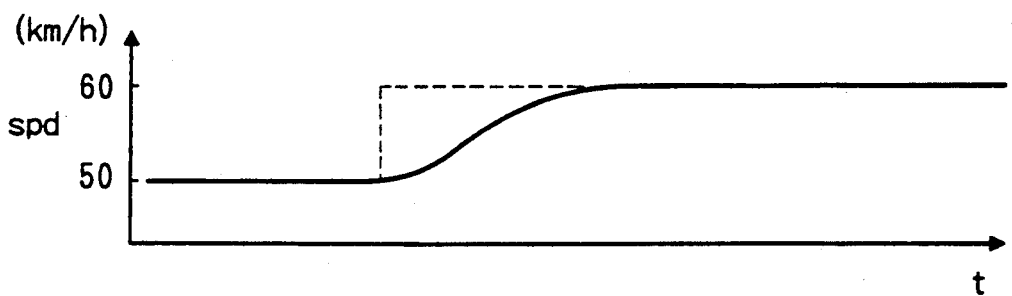
FIG. 23 is a graphic diagram showing experiment results obtained under the this embodiment automotive cruise control in the case of the resume operation.

FIGS. 22 and 23 respectively show the experiment results of a conventional technique and this embodiment at the time of the resume operation. The resume means that, after interrupt of constant-speed travelling, the constant-speed travelling is again started. FIG. 22 shows the result obtained under the PID control. The vehicle speed vibrates to be very late in settling to the target vehicle speed. On the other hand, as seen from FIG. 23 showing the result obtained by the execution of this embodiment, the vehicle speed is quickly coincident with the target vehicle speed. This is because the state feedback is effected with respect to the vehicle speed servo.

Figure 24:
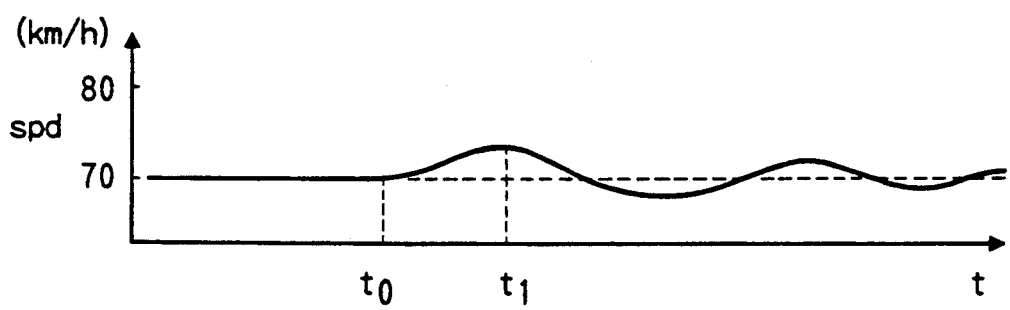
FIG. 24 is a graphic illustration of a characteristic obtained under conventional PID control in the case of over-ride operation.
Figure 25:
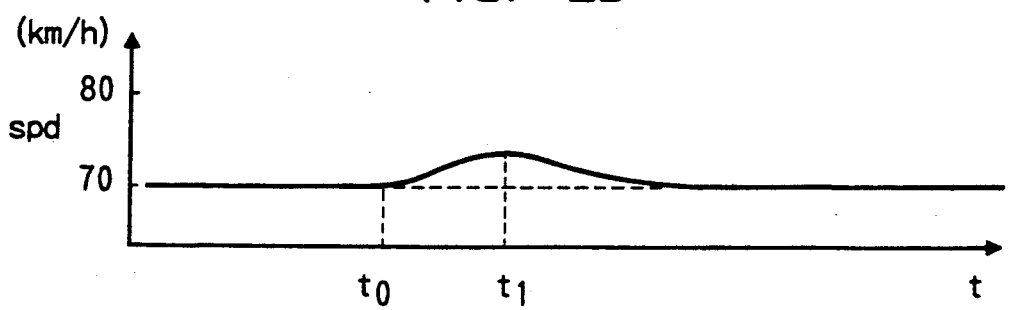
FIG. 25 is a graphic diagram for describing a characteristic obtained by the present embodiment in the case of the over-ride operation.
Figure 26:
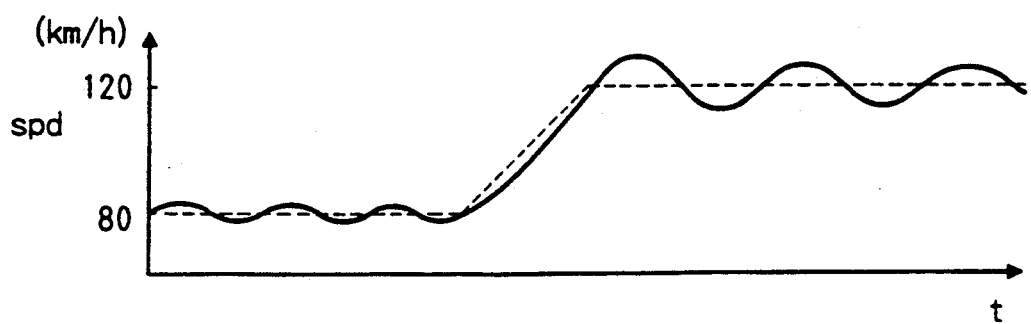
FIG. 26 is a graphic illustration of a characteristic obtained in the case that the target vehicle speed is greatly varied under PID control.
Figure 27:
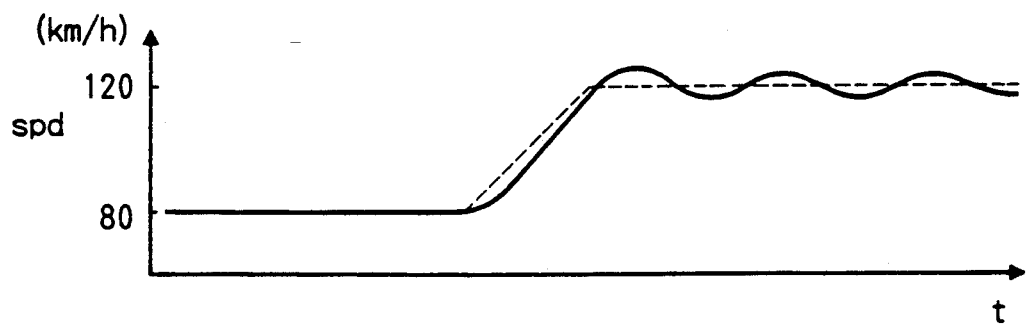
FIG. 27 is a graphic illustration of a characteristic obtained in the case that the target vehicle speed is greatly varied under the modern control.
Figure 28:
FIG. 28 is a graphic illustration of a characteristic obtained according to this embodiment in the case of the great variation of the target vehicle speed.

FIGS. 24 and 25 shows the experiment results obtained in response the over-ride operation. The over-ride means that during the constant-speed travelling the vehicle driver depresses the acceleration pedal of the motor vehicle to temporarily accelerate the motor vehicle. In the drawings, the acceleration pedal is depressed from a time to to a time tl. In practice, this acceleration-pedal depressing operation results in giving a great disturbance to the control system. FIG. 24 shows the result obtained under the PID control where, after the over-ride operation, the vehicle speed vibrates so as to slowly approach the target vehicle speed. On the other hand, FIG. 25 shows the result obtained according to this embodiment where the vehicle speed quickly does not vibrate and directs to the target vehicle speed. FIGS. 26, 27 and 28 show experiment results obtained in the case that the target vehicle speed greatly varies from 80 km/h to 120 km/h. FIG. 26 illustrates the result obtained under the PID control. Here, although the vehicle speed varies with small amplitudes when the target vehicle speed is set to 80 km/h, the vehicle speed varies with great amplitudes in response to variation of the target vehicle speed to 120 km/h. FIG. 28 illustrates the result obtained under the modern control in which the optimal feedback gain is fixed. Here, although the vehicle speed is desirably controllable under the condition that the target vehicle speed is 80 km/h, the vehicle speed vibrates in response to variation of the target vehicle speed to 120 km/h. According to the results illustrated in FIGS. 26 and 27, the vehicle model is greatly varied in response to the variation of the target vehicle speed from 80 km/h to 120 km/h, thereby deteriorating the control performance. On the other hand, according to the result due to this embodiment, as illustrated in FIG. 28, the vehicle speed becomes coincident with the target vehicle speed after elapse of a given time period irrespective of the variation of the target vehicle speed from 80 km/h to 120 km/h.

Figure 29:
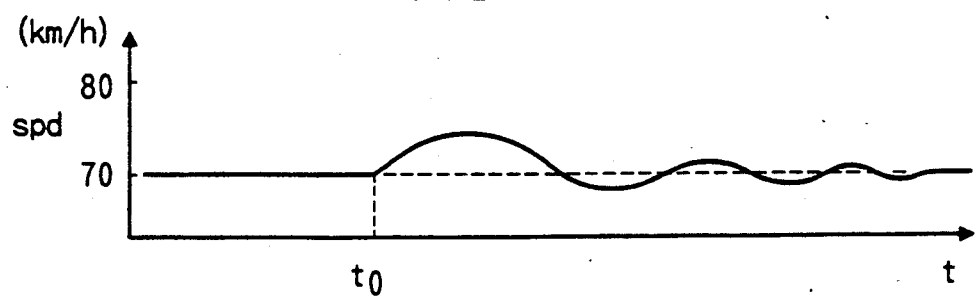
FIGS. 29 to 32 are graphic diagrams showing characteristics obtained in the case that a gear-shift is performed under PID control and this embodiment control.
Figure 30:
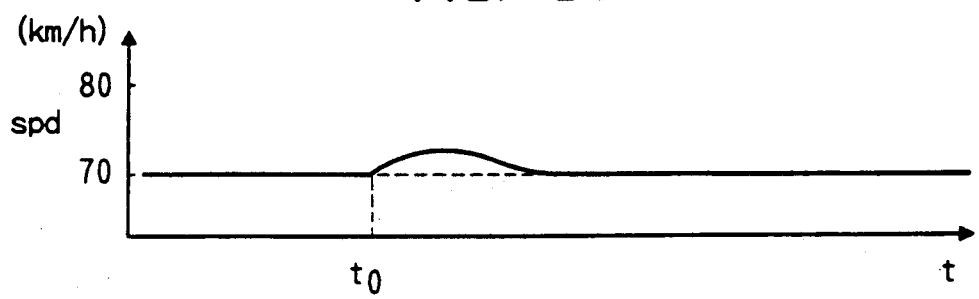
Figure 31:
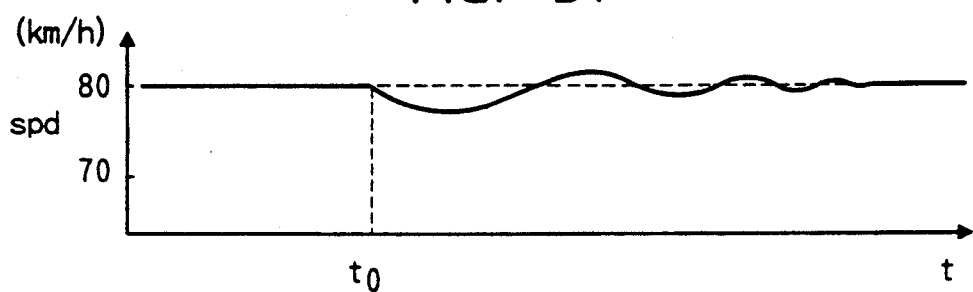
Figure 32:
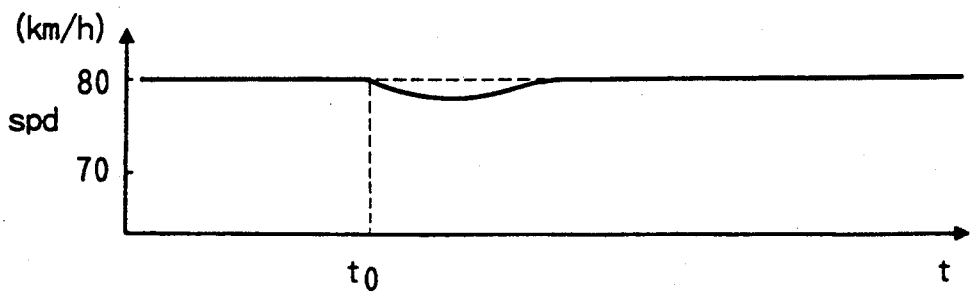
Figure 33:
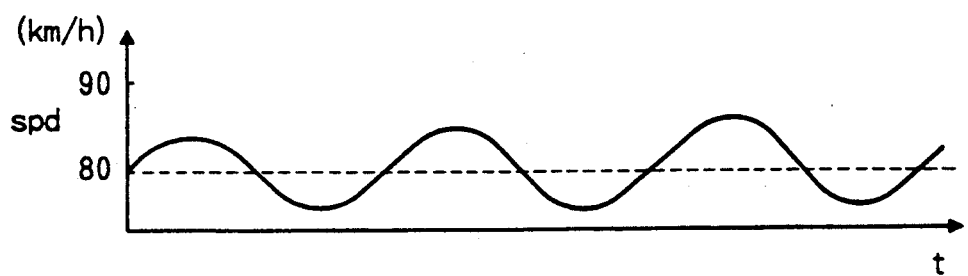
FIGS. 33 to 35 are graphic diagram for describing characteristics obtained by conventional techniques and this embodiment in the case that a control parameter is employed for a motor vehicle which is different in type.
Figure 34:
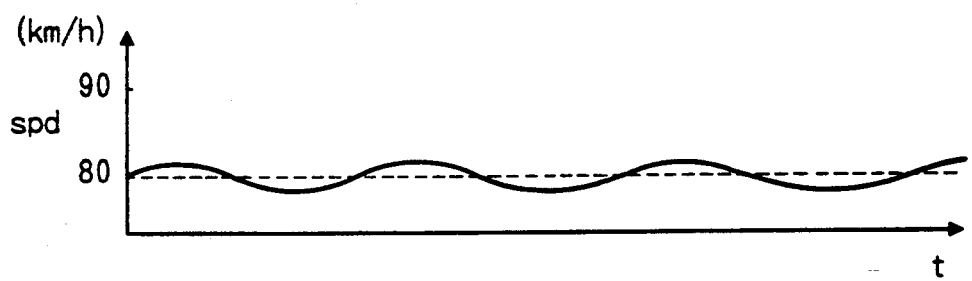
Figure 35:
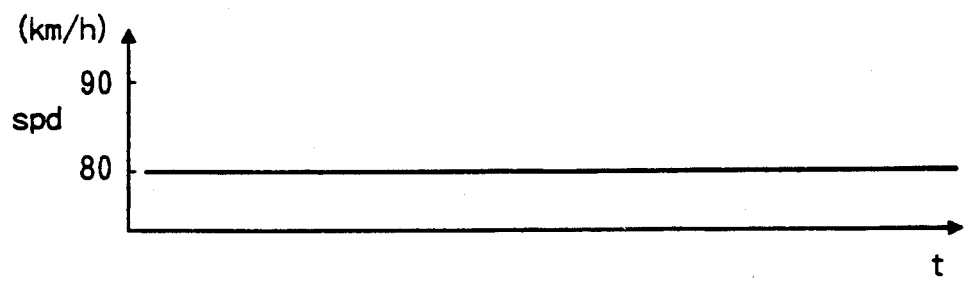

FIGS. 29 and 30 respectively show the experiment results in the case of shift-down from the fourth-step to the third-step at a time to. That is, FIG. 29 shows the result in the case that the coefficient is set to be adaptable for the fourth-step in the PID control. In response to the shift-down to the third-step, the vehicle speed greatly increases and then vibrates toward the target vehicle speed. On the other hand, according to the result of this embodiment illustrated in FIG. 30, although the vehicle speed slightly increases before becoming coincident with the target vehicle speed. FIGS. 31 and 32 show the experiment results in the case of shift-up from the third-step to the fourth-step at a time to when the motor vehicle is running on an ascent. More specifically, FIG. 31 illustrates the result obtained in the case that the coefficient is set to be adaptable to the third-step in the PID control. In response to the shift-up to the fourth-step, the vehicle speed greatly decreases and then vibrates toward the target vehicle speed. On the other hand, according to the result of this embodiment, as illustrated in FIG. 32, although the vehicle speed slightly decreases, the vehicle speed quickly directs to the target vehicle speed. FIGS. 33, 34 and 35 illustrate the experiment results obtained when the motor vehicle is running on a flat road surface under constant-speed travelling control in the case that a control parameter is determined with respect to a specific kind of motor vehicle and the control parameter is employed for a different kind of motor vehicle. In FIG. 33 showing the result obtained under the PID control, the vehicle speed greatly vibrates so as not to be coincident with the target vehicle speed. FIG. 34 illustrates the result obtained under the gain-schedule type modern control in which the optimal regulator gain is switched in accordance with the vehicle speed or others. Similarly, the vehicle speed vibrates with relatively small amplitudes so as not to be coincident with the target vehicle speed in the case of a different kind of motor vehicle, that is, in the case that the optimal gain is difficult to be calculated in advance of motor vehicle. On the other hand, according to this embodiment, as illustrated in FIG. 35, the vehicle speed becomes coincident with the target vehicle speed after elapse of a given time period irrespective of a different kind of motor vehicle, i.e., irrespective of change of the model of the controlled apparatus.

In this embodiment, models are constructed by performing the on-line identifications in accordance with the recursive least squares method with respect to two control systems: the actuator system comprising the motor 19, reduction device 29, clutch 21, link mechanism 22, throttle valve 23, return spring 24 and others and the vehicle system comprising the engine, transmission, wheel, vehicle body and others. Further, in accordance with the Certainty Equivalence principle in which the control constant of the constructed model is regarded as a true value, the control parameters for the dead beat control and the state feedback control in which a discrete-time system integrator is added are determined by on-line, and on the basis of the determined control parameters are effected the adaptive control, in which with respect to the vehicle system the target throttle valve opening degree is obtained by using the real vehicle speed and the target vehicle speed and with respect to the actuator system the actuator control amount is obtained by using the throttle valve opening degree and the target throttle valve opening degree. Thus, with the model being constructed by the on-line identification, it is possible to omit the conventional identification for the controlled system model which is to be performed in advance in design for each kind of motor vehicle In addition, it is possible to be sufficiently adaptable irrespective of the characteristic variation of the actuator system due to time passage and the sequential variation of the vehicle system characteristic. Further, since the control system model is separated into the vehicle system model and the actuator system model, it is possible to accurately perform the model identification with sequential orders, thereby reducing the load to the electronic control unit.

Still further, since the control parameter is determined in accordance with the model constructed by the on-line identification, the control amount can be determined using the previous control input and output amount on the basis of the control parameter, and hence the load to the electronic control unit can be reduced. Moreover, since the identification for the actuator system model is not performed until the maximum value and minimum value of the throttle valve opening degree become above predetermined values within a predetermined time period, the load to the electronic control unit can similarly be reduced. In addition, since the relation between the processing time Tv for the vehicle-speed servo and the processing time Ta for the throttle servo is determined to be Tv>>Ta, in the arrangement of the vehicle-speed servo the transfer function of the throttle servo can be approximated to 1 and hence the load to the electronic control unit can be reduced. Further, the constant-speed travelling control executed during the initial identification of the actuator system is arranged to be open-loop control in which the target throttle valve opening degree is obtained on the basis of the target vehicle speed and the throttle valve is step-wise opened by a predetermined opening degree up to the target throttle valve opening degree, and therefore, it is possible to improve the accuracy of the on-line identification. Still further, in the throttle sero control, the steady-state position deviation can be reduced to zero at one sampling time by execution of the dead beat control in the case that the controlled object is a first-order model. In addition, with the initial value of the vehicle-speed servo being set so that the response is lower than the aiming response, it is possible to prevent vibrating variation of the throttle valve opening degree from the control start. Moreover, since in the inital identification for the actuator system model the average values of the constants a and b of the model identified during the open-loop control to be executed until the throttle valve opening degree becomes above the target throttle valve opening degree are used as the constants a and b of the model due to the initial identification, it is possible to improve the accuracy of the identification. Further, since the control parameters relating to the vehicle-system model, actuator-system model, throttle servo and vehicle-speed servo are stored in a back-up type RAM (bu-RAM 14) which always and directly receives a constant voltage from a battery (25), the memory contents are kept irrespective of turning-off of the ignition switch of the motor vehicle, and therefore it is possible to accurately perform the constant-speed travelling control immediately after the next turning-on of the ignition switch.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, although in this embodiment the on-line identification is performed in accordance with the recursive least squares method, it is also appropriate to perform the on-line identification in accordance with the augmented least squares method or the like. Further, although in the embodiment the dead beat control is executed for the throttle servo control, it is also appropriate to use the PID control, optimal regulator control or the like. Still further, although the detection of the shift of the transfer function obtained on the basis of the actuator-system model is based on the fact that the deviation is produced when the difference between the maximum and minimum values of the throttle valve opening degree becomes above a predetermined value within a predetermined time period, it is also appropriate to detect occurrence of the shift when the integration value of the absolute value of the difference between the target throttle valve opening degree and the throttle valve opening degree becomes above a predetermined value within a predetermined time, or to detect the occurrence of the shift when at least one of the positive deviation and the negative deviation becomes above a predetermined value. In addition, although in the embodiment the actuator-system control parameter and the vehicle-system control parameter set on the basis of the models on-line-identified are stored in the Bu-RAM and maintained therein even if the ignition key of the motor vehicle is turned off, it is also appropriate to store in the Bu-RAM the vehicle-system model and the actuator-system model or to store therein one of the actuator-system control parameter and the actuator-system model.

What is claimed is:

1. A constant-speed travelling control system for use in a motor vehicle, comprising:
   vehicle-speed detecting means for detecting a speed of said motor vehicle;
   target vehicle speed setting means for setting a target speed of said motor vehicle;
   actuator means for regulating the vehicle speed;
   actuator operation detecting means for detecting an operation state of said actuator means;
   actuator-system identification means for on-line-identifying an actuator-system model whose input is an actuator control signal and whose output is an actual operation state of said actuator means;
   vehicle-system identification means for on-line-identifying a vehicle-system model whose input is said actual operation state of said actuator means and whose output is an actual vehicle speed of said motor vehicle;
   identification executing means for causing said vehicle-system and actuator-system identification means to identify said models at different timings; and
   control means for outputting an actuator control signal to said actuator means on the basis of said vehicle-system model and said actuator-system model, so that the vehicle speed detected becomes coincident with the set target vehicle speed.

2. A system as claimed in claim 1, wherein said control means includes:
   target operation state determining means for determining a target operation state of said actuator means on the basis of the identified actuator-system model in accordance with the detected vehicle speed and the set target vehicle speed; and actuator control signal generating means for generating said actuator control signal in accordance with the identified vehicle-system model on the basis of the detected operation state of said actuator means and the target operation state of said actuator means determined by said target operation state determining means.

3. A system as claimed in claim 2, wherein said target operation state determining means includes actuator-system control parameter setting means for on-line setting an actuator-system control parameter, said actuator-system control parameter being used for determining the target operation state of said actuator means, said setting using a transfer function obtained on the basis of the actuator-system model on-line-identified by said actuator-system identification means and being regarded as a true value of a transfer function of the actuator system.

4. A system as claimed in claim 3, wherein said actuator-system identification means includes:
   shift detecting means for detecting when a shift occurs between the characteristics of the actuator means model on-line identified by said actuator-system identification means and the actual actuator means characteristics; and
   re-identification means for causing said actuator-system identification means to on-line reidentify the actuator means model so that the shift is cancelled in the case that said shift detecting means has detected said shift.

5. A system as claimed in claim 4, wherein said shift detecting means includes at least one of:
   first decision means for deciding the occurrence of the shift when the deviation between the maximum and minimum values of the actuator means operation state becomes above a predetermined value within a predetermined time period;
   second decision means for deciding the occurrence of the shift when the integration value of the absolute value of the deviation between the actuator means target operation state and the actuator means operation state becomes above a predetermined value within a predetermined time period; and
   third decision means for deciding the occurrence of the shift when at least one of the positive and negative deviations between the actuator means target operation state and the actuator means operation state becomes above a predetermined value.

6. A system as claimed in claim 2, wherein said control means is arranged such that a processing period of said target operation state determining means is set to be longer than that of said actuator control signal generating means.

7. A system as claimed in claim 1, wherein said control means includes:
   vehicle-system control parameter setting means for on-line setting a vehicle-system control parameter, said vehicle-system control parameter being used for determining said actuator control signal, said setting using a transfer function obtained on the basis of the vehicle-system model identified by said vehicle-system identification means and being regarded as a true value of a transfer function in the vehicle system.

8. A system as claimed in claim 7, wherein said control means includes control parameter storing means for storing at least one of the vehicle system control parameter set by said vehicle-system control parameter setting means and the actuator-system control parameter set by said actuator-system control parameter setting means and for maintaining the contents of the stored control parameter even if an ignition switch of said motor vehicle is turned off.

9. A system as claimed in claim 1, wherein said vehicle-system identification means on-line identifies the vehicle-system model at a predetermined time interval.

10. A system as claimed in claim 1, wherein said actuator-system identification means includes:
   model identification detecting means for detecting whether the actuator-system model has been identified and for generating a negative detection signal when the actuator-system model has not been identified;
   open control means responsive to said negative detection signal from said model identification detecting means for setting a target operation state of said actuator means in accordance with the set target vehicle speed so as to output said actuator control signal and stepwise vary the operation state of said actuator means by a predetermined amount so that the operation state of said actuator means becomes coincident with the set target operation state thereof; and
   initial identification means for on-line-identifying the actuator-system model on the basis of the actuator means operation state and the actuator control amount when said open control means is in operation.

11. A system as claimed in claim 1, wherein said control means includes identification model storing means for storing at least one of the vehicle-system model identified by the vehicle-system identification means and the actuator-system model identified by the actuator-system identification means and for maintaining the contents of the stored model even if an ignition switch of said motor vehicle is turned off.

12. A system as claimed in claim 11, wherein said identification model storing means comprises reading- and writing-allowed storing means which is arranged to be always powered with a constant voltage from a battery provided in said motor vehicle.

13. A system as claimed in claim 1, wherein said actuator-system identification means is arranged so as to on-line identify the actuator-system model at the initial stage of the constant-speed travelling control and to identify the same model again only under the condition that a shift occurs between the identified actuator-system model and the actuator.

* * * * *